US011099364B2

United States Patent
Ikeda et al.

(10) Patent No.: US 11,099,364 B2
(45) Date of Patent: Aug. 24, 2021

(54) ZOOM LENS AND IMAGING APPARATUS

(71) Applicant: FUJIFILM Corporation, Tokyo (JP)

(72) Inventors: Shinkichi Ikeda, Saitama (JP); Takuya Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 211 days.

(21) Appl. No.: 16/451,698

(22) Filed: Jun. 25, 2019

(65) Prior Publication Data

US 2020/0004000 A1 Jan. 2, 2020

(30) Foreign Application Priority Data

Jun. 29, 2018 (JP) .............................. JP2018-125342

(51) Int. Cl.
*G02B 15/14* (2006.01)
*G02B 15/28* (2006.01)
(Continued)

(52) U.S. Cl.
CPC ..... *G02B 15/145129* (2019.08); *G02B 15/16* (2013.01); *G02B 15/28* (2013.01);
(Continued)

(58) Field of Classification Search
CPC ........... G02B 15/16; G02B 15/145129; G02B 13/02; G02B 27/646; G02B 15/28;
(Continued)

(56) References Cited

U.S. PATENT DOCUMENTS

2012/0019924 A1   1/2012 Shimomura
2012/0320251 A1*  12/2012 Saito .................... G02B 27/646
                                                      348/340
(Continued)

FOREIGN PATENT DOCUMENTS

JP    2012-027308 A   2/2012
JP      5836654 B2   12/2015
(Continued)

OTHER PUBLICATIONS

An Office Action; "Notice of Reasons for Refusal", mailed by the Japanese Patent Office dated Jun. 1, 2021, which corresponds to Japanese Patent Application No. 2018-125342 and is related to U.S. Appl. No. 16/451,698; with English language translation.

*Primary Examiner* — Kristina M Deherrera
(74) *Attorney, Agent, or Firm* — Studebaker & Brackett PC

(57) ABSTRACT

A zoom lens consists of a positive first lens group that is fixed during zooming, a negative second lens group that moves during zooming, a positive third lens group that moves during zooming, a positive fourth lens group that moves during zooming, and a positive fifth lens group that is fixed during zooming. During zooming from a wide angle end to a telephoto end, the fourth lens group moves from an image side to an object side, the second lens group and a composite group consisting of the third lens group and the fourth lens group pass through points where respective lateral magnifications are −1 at the same time, the fifth lens group consists of a negative fifth A lens group that moves during anti-shake operation, and a positive fifth B lens group that is fixed during the anti-shake operation, and the lateral magnification of the fifth A lens group is negative.

20 Claims, 11 Drawing Sheets

(51) Int. Cl.
  *G02B 27/64* (2006.01)
  *G02B 15/16* (2006.01)
  *G02B 9/60* (2006.01)
  *G02B 9/62* (2006.01)
  *G02B 9/64* (2006.01)

(52) U.S. Cl.
  CPC .............. *G02B 27/646* (2013.01); *G02B 9/60* (2013.01); *G02B 9/62* (2013.01); *G02B 9/64* (2013.01); *G02B 15/1461* (2019.08)

(58) Field of Classification Search
  CPC ........ G02B 15/1461; G02B 9/60; G02B 9/62; G02B 9/64
  USPC ......................................................... 359/764
  See application file for complete search history.

(56) References Cited

U.S. PATENT DOCUMENTS

| | | | |
|---|---|---|---|
| 2013/0113980 | A1* | 5/2013 | Nakamura ..... G02B 15/145129 |
| | | | 348/345 |
| 2015/0092280 | A1 | 4/2015 | Ikeda et al. |
| 2015/0247996 | A1 | 9/2015 | Ikeda et al. |
| 2016/0161725 | A1 | 6/2016 | Shimomura |
| 2017/0108676 | A1* | 4/2017 | Hori ................... G02B 15/1461 |

FOREIGN PATENT DOCUMENTS

| | | | |
|---|---|---|---|
| JP | 2016109952 | A | 6/2016 |
| WO | 2013/187000 | A1 | 12/2013 |
| WO | 2014/073186 | A1 | 5/2014 |

* cited by examiner

EXAMPLE 2

EXAMPLE 3

FIG. 5 EXAMPLE 5

ZOOM LENS AND IMAGING APPARATUS

CROSS REFERENCE TO RELATED APPLICATIONS

The present application claims priority under 35 U.S.C. § 119 to Japanese Patent Application No. 2018-125342 filed on Jun. 29, 2018. The above application is hereby expressly incorporated by reference, in its entirety, into the present application.

BACKGROUND OF THE INVENTION

1. Field of the Invention

The present invention relates to a zoom lens and an imaging apparatus.

2. Description of the Related Art

In recent years, high image quality of a video has been advanced, and there is a demand for a lens system having a resolution performance of 4K or more which can be used for an imaging apparatus such as a broadcasting camera. For a lens system for the broadcasting camera, it is preferable to have a zooming function so as to cope with various scenes, and as a result, the zoom lens is required to have a high magnification. Furthermore, as the magnification of the zoom lens is increased and the focal length on the telephoto side is longer, the zoom lens becomes susceptible to vibration and camera shake. Therefore, for imaging, a shake-proof function is required. As the zoom lens with the shake-proof function, zoom lenses are disclosed in JP2016-109952A and JP5836654B.

SUMMARY OF THE INVENTION

However, the zoom lenses disclosed in JP2016-109952A and JP5836654B have a problem that fluctuation in aberration during the anti-shake operation is not sufficiently suppressed.

The present disclosure has been made in consideration of the above-mentioned situations, and it is an object of the present disclosure to provide a zoom lens which has a shake-proof function and implements a high image quality and a high magnification by suppressing fluctuation in aberration during an anti-shake operation, and an imaging apparatus comprising the zoom lens.

Specific means to solve the above-mentioned object includes the following aspects.

<1> There is provided a zoom lens consisting of, in order from an object side, a first lens group having a positive refractive power, a second lens group having a negative refractive power, a third lens group having a positive refractive power, a fourth lens group having a positive refractive power, and a fifth lens group having a positive refractive power, in which during zooming, the first lens group and the fifth lens group are fixed with respect to an image plane, and the second lens group, the third lens group, and the fourth lens group move with mutual intervals therebetween being changed, during zooming from a wide angle end to a telephoto end, the fourth lens group moves from an image side to the object side, and the second lens group and a composite group consisting of the third lens group and the fourth lens group pass through points where respective lateral magnifications are −1 at the same time, the fifth lens group consists of, in order from the object side, a fifth A lens group having a negative refractive power and moving in a direction having a component perpendicular to an optical axis during anti-shake operation to perform image shake correction, and a fifth B lens group having a positive refractive power and being fixed during the anti-shake operation, and the lateral magnification of the fifth A lens group is negative.

<2> In the zoom lens of <1>, assuming that the lateral magnification of the fifth A lens group is β5A, Conditional Expression (1) is satisfied.

$$-0.3 < 1/\beta 5A < 0 \tag{1}$$

<3> In the zoom lens of <1> or <2>, assuming that the lateral magnification of the fifth A lens group is β5A and the lateral magnification of the fifth B lens group is β5B, Conditional Expression (2) is satisfied.

$$-1.3 < (1-\beta 5A) \times \beta 5B < -1 \tag{2}$$

<4> In the zoom lens of any one of <1> to <3>, assuming that the lateral magnification of the fifth lens group is β5, Conditional Expression (3) is satisfied.

$$0.9 < 1/\beta 5 < 1.1 \tag{3}$$

<5> In the zoom lens of any one of <1> to <4>, assuming that the lateral magnification of the fifth A lens group is β5A, the lateral magnification of the fifth B lens group is β5B, and the lateral magnification of the fifth lens group is β5, Conditional Expression (4) is satisfied.

$$-1.4 < (1-\beta 5A) \times \beta 5B/\beta 5 < -1 \tag{4}$$

<6> In the zoom lens of any one of <1> to <5>, assuming that a focal length of the fifth A lens group is f5A and a focal length of the fifth lens group is f5, Conditional Expression (5) is satisfied.

$$-1.2 < f5A/f5 < -0.5 \tag{5}$$

<7> In the zoom lens of any one of <1> to <6>, assuming that a focal length of the fifth A lens group is f5A and a focal length of the fifth B lens group is f5B, Conditional Expression (6) is satisfied.

$$-1 < f5A/f5B < -0.6 \tag{6}$$

<8> In the zoom lens of any one of <1> to <7>, the fifth A lens group consists of two negative lenses and one positive lens.

<9> In the zoom lens of any one of <1> to <8>, the fifth B lens group consists of, in order from the object side, a fifth MN lens group having a positive refractive power and a fifth B2 lens group having a positive refractive power, the fifth B1N lens group is replaceable with a fifth B1E lens group that enlarges imaging magnification, a position where the fifth B1N lens group and the fifth B2 lens group are divided is a place in which an air gap on an optical axis is the largest in a state where, assuming that a lateral magnification of the fifth B2 lens group is β5B2, Conditional Expression (7) is satisfied, and assuming that a focal length of the fifth B2 lens group is f5B2 and a focal length of the fifth MN lens group is f5B1N, Conditional Expression (8) is satisfied.

$$-1 < \beta 5B2 < 1 \tag{7}$$

$$F5B2/f5B1N < 0.5 \tag{8}$$

<10> In the zoom lens of <9>, assuming that a focal length of the fifth A lens group is f5A and a focal length of the fifth MN lens group is f5B1N, Conditional Expression (9) is satisfied.

$$-0.5 < f5A/f5B1N \tag{9}$$

<11> In the zoom lens of <9> or <10>, the fifth MN lens group comprises, in order from the object side, at least two continuous cemented lenses and a positive lens of which a surface on the object side is convex.

<12> In the zoom lens of <2>, Conditional Expression (1-1) is satisfied.

$$0.2<1/\beta 5A<0 \quad (1-1)$$

<13> In the zoom lens of <3>, Conditional Expression (2-1) is satisfied.

$$-1.2<(1-\beta 5A)\times \beta 5B<-1.1 \quad (2-1)$$

<14> In the zoom lens of <4>, Conditional Expression (3-1) is satisfied.

$$0.91<1/\beta 5<1 \quad (3-1)$$

<15> In the zoom lens of <5>, Conditional Expression (4-1) is satisfied.

$$-1.3<(1-\beta 5A)\times \beta 5B/\beta 5<-1 \quad (4-1)$$

<16> In the zoom lens of <6>, Conditional Expression (5-1) is satisfied.

$$-1.1<f5A/f5<-0.5 \quad (5-1)$$

<17> In the zoom lens of <7>, Conditional Expression (6-1) is satisfied.

$$-0.9<f5A/f5B<-0.7 \quad (6-1)$$

<18> In the zoom lens of <9>, Conditional Expression (8-1) is satisfied.

$$0.1<f5B2/f5B1N<0.4 \quad (8-1)$$

<19> In the zoom lens of <10>, Conditional Expression (9-1) is satisfied.

$$-0.4<f5A/f5B1N<-0.1 \quad (9-1)$$

<20> There is provided an imaging apparatus comprising the zoom lens according to any one of <1> to <19>.

In the present specification, it should be noted that the terms "consisting of ~" and "consists of ~" mean that, in addition to the components listed, a lens that substantially has no refractive powers, an optical element, which are not the lens, such as a stop, a filter, and a cover glass, and a mechanism part such as a lens flange, a lens barrel, an imaging element, and a camera shaking correction mechanism may be included.

In the present specification, it should be noted that "~ group having a positive refractive power" means that the group has a positive refractive power as a whole. Likewise, the "~ group having a negative refractive power" means that the group has a negative refractive power as a whole. "Lens having a positive refractive power" and "positive lens" are synonymous. "Lens having a negative refractive power" and "negative lens" are synonymous. The "lens group" is not limited to a composition that consists of a plurality of lenses, and may be a composition of only one lens.

Further, values used in the conditional expression are values in the case of using the d line as a reference in a state focused on an object at infinity. It should be noted that the partial dispersion ratio θgF between the g line and the F line of a certain lens is defined by θgF=(Ng−NF)/(NF−NC), where Ng, NF, and NC are the refractive indices of the lens at the g line, the F line, and the C line, respectively. The "d line", "C line", "F line", and "g line" described in this specification are bright lines, the wavelength of the d line is 587.56 nm (nanometer), the wavelength of the C line is 656.27 nm (nanometer), the wavelength of the F line is 486.13 nm (nanometer), and the wavelength of the g line is 435.84 nm (nanometer).

With the present disclosure, a zoom lens which has a shake-proof function and implements a high image quality and a high magnification by suppressing fluctuation in aberration during an anti-shake operation, and an imaging apparatus comprising the zoom lens can be provided.

DESCRIPTION OF THE PREFERRED EMBODIMENTS

Figure 1:
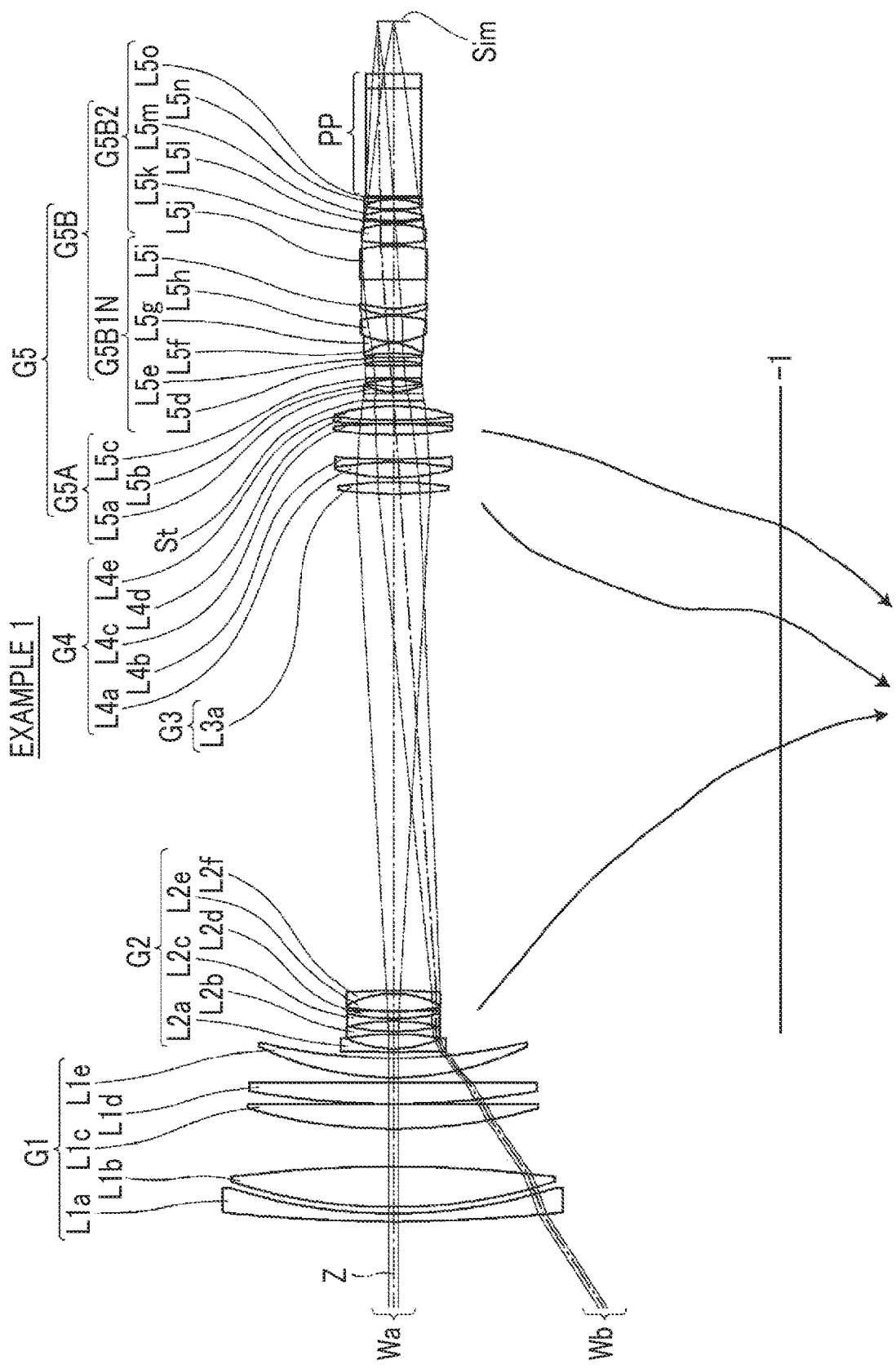
FIG. 1 is a cross-sectional view illustrating a composition of a zoom lens of Example 1 of the present invention.

Hereinafter, an embodiment of the present invention will be described with reference to drawings. FIG. 1 is a cross-sectional view illustrating a composition of a zoom lens at the wide angle end according to an embodiment of the present invention. The composition example illustrated in FIG. 1 corresponds to a zoom lens according to Example 1 of the present invention described later. In FIG. 1, the left side is the object side and the right side is the image side. In addition, FIG. 1 shows a state of focusing on an object at infinity, and on-axis rays Wa and rays Wb with the maximum angle of view are also shown. In FIG. 1, the movement loci of a second lens group G2, a third lens group G3, and a fourth lens group G4 during zooming are also shown. Further, in FIG. 1, the positions, where the lateral magnification of each of the second lens group G2 and the composite group consisting of the third lens group G3 and the fourth lens group G4 is −1 times, are also shown.

The zoom lens shown in FIG. 1 consists of, in order from the object side to the image side along the optical axis Z, a first lens group G1 having a positive refractive power, the second lens group G2 having a negative refractive power, the third lens group G3 having a positive refractive power, the fourth lens group G4 having a positive refractive power, and a fifth lens group G5 having a positive refractive power. During zooming, the first lens group G1 And the fifth lens group G5 are configured to be fixed with respect to an image plane Sim, and the second lens group G2, the third lens group G3, and the fourth lens group G4 are configured to move while mutual intervals changed.

With such a composition, axial chromatic aberration, especially, axial chromatic aberration on the telephoto side, which is likely to be expanded, can be suppressed while suppressing fluctuation of aberrations during zooming, which makes it possible to achieve the zoom lens having a zoom ratio of 30 times or more.

In the example of FIG. 1, an optical member PP having an incident surface and an emitting surface perpendicular to the optical axis Z is disposed between the fifth lens group G5 and the image plane Sim. The optical member PP is assumed to be a filter (of various types), a prism, cover glass, and/or the like. In the present invention, the optical member PP may be disposed at a position different from that in the example of FIG. 1, or the optical member PP may be omitted. It should be noted that the aperture stop St shown in FIG. 1 does not necessarily indicate its size or shape, and indicates a position of the aperture stop St on the optical axis Z.

In zooming from the wide angle end to the telephoto end, the fourth lens group G4 moves from the image side to the object side. The second lens group G2 and the composite group consisting of the third lens group G3 and the fourth lens group G4 are configured to pass through points where respective lateral magnifications are −1 times at the same time. With such a composition, it is possible to achieve a zoom lens having a zoom ratio of 30 times or more while maintaining high image quality over the entire zoom range.

The fifth lens group G5 includes, in order from the object side, a 5A lens group G5A having a negative refractive power and moving in a direction having a component in the direction perpendicular to the optical axis Z during an anti-shake operation to perform image shake correction, and a 5B lens group G5B having a positive refractive power and being fixed during the anti-shake operation.

With the composition, it is possible to provide the zoom lens with a shake-proof function. Further, in the zoom lens according to the present embodiment, since the ray is incident on the fifth lens group G5 from the fourth lens group G4 as convergent light, as described above, the fifth A lens group G5A having a negative refractive power and the fifth B lens group G5B having a positive refractive power are disposed in order from the object side, which makes it easy to extend the back focus, and therefore advantageously suppress spherical aberration in the entire zoom range.

The lateral magnification of the fifth A lens group G5A is negative. In the zoom lens according to the present embodiment, since the ray is incident on the fifth lens group G5 from the fourth lens group G4 as convergent light, when the lateral magnification of the fifth A lens group G5A is negative, symmetry of the entrance side and the exit side of an on-axis marginal ray with regard to the fifth A lens group G5A is better than when the lateral magnification of the fifth A lens group G5A is positive. In this way, it is possible to reduce fluctuation in aberration during the anti-shake operation.

In the zoom lens according to the present embodiment, it is preferable that, assuming that the lateral magnification of the fifth A lens group G5A is β5A, Conditional Expression (1) is satisfied. By not allowing the value of Conditional Expression (1) to be equal to or greater than the upper limit, the symmetry of the entrance side and the exit side of the on-axis marginal ray with respect to the fifth A lens group G5A is improved, and thus it is possible to reduce fluctuation in aberration during the anti-shake operation. By not allowing the value of Conditional Expression (1) to be equal to or less than the lower limit, the height of the on-axis marginal ray incident on the fifth B lens group G5B can be reduced, which makes it advantageous to suppress the occurrence of spherical aberration. Furthermore, if Conditional Expression (1-1) is satisfied, better characteristics can be obtained.

$$-0.3 < 1/\beta 5A < 0 \quad (1)$$

$$0.2 < 1/\beta 5A < 0 \quad (1-1)$$

Assuming that the lateral magnification of the fifth A lens group G5A is β5A and the lateral magnification of the fifth B lens group G5B is β5B, it is preferable that Conditional Expression (2) is satisfied. By not allowing the value of Conditional Expression (2) to be equal to or greater than the upper limit, it is possible to suppress the movement amount of the fifth A lens group G5A during the anti-shake operation. Therefore, it is possible to make a followability of the anti-shake lens group (the fifth A lens group G5A) good. By not allowing the value of Conditional Expression (2) to be equal to or less than the lower limit, it is possible to prevent the sensitivity of the anti-shake lens group (fifth A lens group G5A) from becoming too high, and therefore it is possible to easily control the image position during the anti-shake operation. Furthermore, if Conditional Expression (2-1) is satisfied, better characteristics can be obtained.

$$-1.3 < (1-\beta 5A) \times \beta 5B < -1 \quad (2)$$

$$-1.2 < (1-\beta 5A) \times \beta 5B < -1.1 \quad (2-1)$$

Assuming that the lateral magnification of the fifth lens group G5 is β5, it is preferable that Conditional Expression (3) is satisfied. By not allowing the value of Conditional Expression (3) to be equal to or greater than the upper limit, it is possible to keep combined focal length from the first lens group G1 to the fourth lens group G4 short, and therefore it is possible to suppress the total length of a zoom unit (the second lens group G2 to the fourth lens group G4), which is advantageous for reducing the lens system. By not allowing the value of Conditional Expression (3) to be equal to or less than the lower limit, it is made easy to extend the back focus, which is advantageous for suppression of spherical aberration in the entire zoom range. Furthermore, if Conditional Expression (3-1) is satisfied, better characteristics can be obtained.

$$0.9 < 1/\beta 5 < 1.1 \quad (3)$$

$$0.91 < 1/\beta 5 < 1 \quad (3-1)$$

Assuming that the lateral magnification of the fifth A lens group G5A is β5A, the lateral magnification of the fifth B lens group G5B is β5B, and the lateral magnification of the fifth lens group G5 is β5, it is preferable that Conditional Expression (4) is satisfied. By not allowing the value of Conditional Expression (4) to equal to or greater than the upper limit, it is advantageous to reduce the size of the lens system while suppressing the moving amount of the anti-shake lens group (the fifth A lens group G5A). By not allowing the value of Conditional Expression (4) to be equal to or less than the lower limit, the sensitivity of the anti-shake lens group (fifth A lens group G5A) is prevented from becoming high, and it is advantageous for suppression of spherical aberration in the entire zoom range. Furthermore, if Conditional Expression (4-1) is satisfied, better characteristics can be obtained.

$$-1.4 < (1-\beta 5A) \times \beta 5B/\beta 5 < -1 \quad (4)$$

$$-1.3 < (1-\beta 5A) \times \beta 5B/\beta 5 < -1 \quad (4-1)$$

Assuming that the focal length of the fifth A lens group G5A is f5A, and the focal length of the fifth lens group G5 is f5, it is preferable that Conditional Expression (5) is satisfied. Allowing the value of Conditional Expression (5) to be below the upper limit makes advantageous to shorten the entire length the fifth lens group G5. Allowing the value of Conditional Expression (5) to be above the lower limit makes it easy to increase the sensitivity of the anti-shake lens group (fifth A lens group G5A). Furthermore, if Conditional Expression (5-1) is satisfied, better characteristics can be obtained.

$$-1.2<f5A/f5<-0.5 \quad (5)$$

$$-1.1<f5A/f5<-0.5 \quad (5-1)$$

Assuming that the focal length of the fifth A lens group G5A is f5A, and the focal length of the fifth B lens group G5B is f5B, it is preferable that Conditional Expression (6) is satisfied. Allowing the value of Conditional Expression (6) to be below the upper limit makes advantageous to shorten the entire length the fifth lens group G5. Allowing the value of Conditional Expression (6) to be above the lower limit makes it easy to increase the sensitivity of the anti-shake lens group (fifth A lens group G5A). Furthermore, if Conditional Expression (6-1) is satisfied, better characteristics can be obtained.

$$-1<f5A/f5B<-0.6 \quad (6)$$

$$-0.9<f5A/f5B<-0.7 \quad (6-1)$$

The fifth A lens group G5A preferably consists of two negative lenses and one positive lens. With such a composition, it is possible to suppress the occurrence of spherical aberration during the anti-shake operation.

It is preferable that the fifth B lens group G5B consists of, in order from the object side, a fifth MN lens group G5B1N having a positive refractive power and a fifth B2 lens group G5B2 having a positive refractive power, the fifth B1N lens group G5B1N is replaceable with a fifth B1E lens group G5B1N that enlarges imaging magnification, a position where the fifth B1N lens group G5B1N and the fifth B2 lens group G5B2 are divided is a place in which an air gap on an optical axis is the largest in a state where, assuming that a lateral magnification of the fifth B2 lens group G5B2 is β5B2, Conditional Expression (7) is satisfied, and assuming that a focal length of the fifth B2 lens group G5B2 is f5B2 and a focal length of the fifth B1N lens group G5B1N is f5B1N, Conditional Expression (8) is satisfied.

$$-1<\beta5B2<1 \quad (7)$$

$$F5B2/f5B1N<0.5 \quad (8)$$

$$0.1<f5B2/f5B1N<0.4 \quad (8-1)$$

When an extender lens (the fifth B1E lens group) is used in which a part of the lens group is replaced and the imaging magnification of the whole system after the replacing is made larger than the imaging magnification of the whole system before the replacing, the fifth B1N lens group G5B1N, which is replaced with the extender lens (the fifth B1E lens group), is disposed on the image side of the fifth A lens group G5A. In this way, it is not necessary to change the control amount of the anti-shake lens group with respect to the anti-shake angle even when the imaging magnification is switched.

Further, by setting a position where the fifth B1N lens group G5B1N and the fifth B2 lens group G5B2 are divided within the range of Conditional Expression (7), the paraxial on-axis ray incident on the fifth B2 lens group G5B2 becomes close to parallel to the optical axis and the fluctuation in the spherical aberration due to the position error on the optical axis of the fifth B1N lens group G5B1N is suppressed. As a result, the above-mentioned position is the optimal one as the dividing position.

By not allowing the value of Conditional Expression (8) to be equal to or greater than the upper limit, it is advantageous for securing the back focus. Furthermore, if Conditional Expression (8-1) is satisfied, better characteristics can be obtained. By not allowing the value of Conditional Expression (8) to be equal to or less than the lower limit, it is possible to appropriately disperse the positive refractive power by the fifth B1N lens group G5B1N and the fifth B2 lens group G5B2, which makes it advantageous to correct spherical aberration.

Assuming that the focal length of the fifth A lens group G5A is f5A, and the focal length of the fifth MN lens group G5B1N is f5B1N, it is preferable that Conditional Expression (9) is satisfied. By not allowing the value of Conditional Expression (9) to be equal to or less than the lower limit, the height of the on-axis marginal ray incident on the fifth B lens group G5B can be reduced, which makes it advantageous to correct spherical aberration. Furthermore, if Conditional Expression (9-1) is satisfied, better characteristics can be obtained. By not allowing the value of Conditional Expression (9) to be equal to or greater than the upper limit, it is advantageous for securing the back focus.

$$-0.5<f5A/f5B1N \quad (9)$$

$$-0.4<f5A/f5B1N<-0.1 \quad (9-1)$$

The fifth B1N lens group G5B1N comprises, in order from the object side, at least two continuous cemented lenses and a positive lens of which a surface on the object side is convex. By continuously disposing the cemented lenses as mentioned above, it is possible to correct axial chromatic aberration while suppressing the occurrence of a difference due to the wavelength of spherical aberration. Also, by setting surface of the positive lens on the object side to be convex, it is possible to reduce the angle at which the on-axis marginal ray enters the surface on the object side, which makes it possible to provide a positive refractive power while suppressing the occurrence of spherical aberration.

The above-mentioned preferred compositions and available compositions may be optional combinations, and it is preferable to selectively adopt the compositions in accordance with required specification.

Next, numerical examples of the zoom lens of the present invention will be described.

Example 1 (Reference State)

The composition of a zoom lens of Example 1 is shown FIG. 1. Since the method illustrated in FIG. 1 has been described above, some redundant descriptions will be omitted here.

The zoom lens of Example 1 is composed of, in order from the object side to the image side along the optical axis Z, a first lens group G1 consisting of five lenses L1a to L1e, a second lens group G2 consisting of six lenses L2a to L2f, a third lens group G3 consisting of only one lens L3a, a fourth lens group G4 consisting of five lenses L4a to L4e, and a fifth lens group G5 consisting of fifteen lenses L5a to L5o.

The fifth lens group G5 is composed of, in order from the object side to the image side along the optical axis Z, a fifth A lens group G5A consisting of three lenses L5a to L5c, a fifth B1N lens group G5B1N consisting of six lenses L5d to L5i, and a fifth B2 lens group G5B2 consisting of six lenses L5j to L5o.

Table 1A and Table 1B show basic lens data of the zoom lens of Example 1, Table 2 shows data on specifications, Table 3 shows data on variable surface distance, and Table 4 shows data on aspheric coefficients.

In the lens data of Table 1, the column of the surface number shows a surface number that sequentially increases toward the image side, with the surface of a component closest to the object side being regarded as the first surface. The column of the curvature radius shows curvature radii of the respective surfaces. The column of the surface distance shows surface distances on the optical axis Z between the respective surfaces and the next surfaces. The column of n shows the refractive index at a d line (a wavelength of 587.56 nm) of each optical element, and the ν column shows the Abbe number at the d line (a wavelength of 587.56 nm) of each optical element, and the column of θgF shows the partial dispersion ratio between a g line (a wavelength of 435.84 nm) and an F line (a wavelength of 486.13 nm) of each optical element.

Reference signs of curvature radii are set to be positive in a case where the surface shapes are convex toward the object side, and reference signs of curvature radii are set to be negative in a case where of the surface shapes are convex toward the image side. The basic lens data includes an aperture stop St and an optical member PP. In the column of a surface number of a surface corresponding to the aperture stop St, the surface number and a term of (stop) are noted. Further, in the lens data of Table 1, DD [surface number] is described in the column of the surface distance in which the distance changes during zooming. The numerical values corresponding to DD [surface number] are shown in Table 3.

The values of zoom magnification, focal length f, F number FNo., the total angle of view 2ω (°) are shown in data on the specifications in Table 2.

In the lens data of Table 1, the reference sign * is attached to surface numbers of aspheric surfaces, and numerical values of the paraxial curvature radius are shown as the curvature radius of the aspheric surface. The data on the aspheric coefficients in Table 4 show surface numbers for the aspheric surfaces and the aspheric coefficients for the aspheric surfaces. The "E±n" (n: an integer) in numerical values of the aspheric coefficients of Table 4 indicates "10±n". The aspheric coefficients are values of the coefficients KA and Am in aspheric surface expression represented as the following expression.

$$Zd = C \times h^2 / \{1 + (1 - KA \times C^2 \times h^2)^{1/2}\} + \Sigma Am \times h^m$$

where Zd is an aspheric depth (from a point on the aspherical surface of the height h, the length of the perpendicular drawn down to the plane perpendicular to the optical axis with which the aspherical apex contacts), h is the height (the distance from the optical axis), C is an inverse of the paraxial curvature radius, KA, Am are aspheric coefficients, and Σ in the aspheric depth Zd is the sum with respect to m.

In the basic lens data and the data on specifications, a degree is used as a unit of an angle, and mm (millimeter) is used as a unit of a length, but appropriate different units may be used since the optical system can be used even in a case where the system is enlarged or reduced in proportion.

TABLE 1A

Example 1: Lens Data (n, ν at d Line)

| Surface Number | Curvature Radius | Surface Distance | n | ν | θgF |
|---|---|---|---|---|---|
| 1 | 955.81543 | 4.400 | 1.834000 | 37.21 | 0.58082 |
| 2 | 302.25870 | 3.644 | | | |
| 3 | 297.42207 | 23.792 | 1.433871 | 95.18 | 0.53733 |
| 4 | −722.93744 | 22.015 | | | |
| 5 | 296.36518 | 14.584 | 1.433871 | 95.18 | 0.53733 |
| 6 | ∞ | 0.120 | | | |
| 7 | 476.16920 | 12.551 | 1.433871 | 95.18 | 0.53733 |
| 8 | ∞ | 2.750 | | | |
| 9 | 171.21493 | 11.514 | 1.438750 | 94.94 | 0.53433 |
| 10 | 322.66349 | DD [10] | | | |
| *11 | 1060.94223 | 2.000 | 2.000694 | 25.46 | 0.61364 |
| 12 | 64.68717 | 8.453 | | | |
| 13 | −163.08241 | 1.500 | 1.788001 | 47.37 | 0.55598 |
| 14 | 118.42396 | 6.286 | | | |
| 15 | −103.99855 | 1.512 | 1.733997 | 51.47 | 0.54874 |
| 16 | 129.96228 | 4.079 | 1.892860 | 20.36 | 0.63944 |
| 17 | 1710.87635 | 0.120 | | | |
| 18 | 181.47743 | 10.158 | 1.805181 | 25.42 | 0.61616 |
| 19 | −56.50189 | 1.610 | 1.804000 | 46.53 | 0.55775 |
| 20 | −477.82923 | DD [20] | | | |
| 21 | 212.18454 | 6.985 | 1.437001 | 95.10 | 0.53364 |
| *22 | −213.88627 | DD [22] | | | |
| 23 | 122.76002 | 8.725 | 1.437001 | 95.10 | 0.53364 |
| 24 | −213.35733 | 1.885 | 1.592701 | 35.31 | 0.59336 |
| 25 | 431.03082 | 14.389 | | | |
| *26 | 181.89382 | 6.303 | 1.437001 | 95.10 | 0.53364 |
| 27 | −418.50132 | 0.179 | | | |
| 28 | 620.24327 | 1.875 | 1.846660 | 23.78 | 0.62054 |
| 29 | 276.42951 | 8.433 | 1.437001 | 95.10 | 0.53364 |
| 30 | −118.94996 | DD [30] | | | |

TABLE 1B

Example 1: Lens Data (n, ν at d Line)

| | | | | | |
|---|---|---|---|---|---|
| 31 (stop) | ∞ | 4.338 | | | |
| 32 | −472.78842 | 0.875 | 1.595220 | 67.73 | 0.54426 |
| 33 | 37.79609 | 0.120 | | | |
| 34 | 37.07247 | 3.277 | 1.841390 | 24.56 | 0.61274 |
| 35 | 69.41856 | 4.015 | | | |
| 36 | −82.56395 | 0.875 | 1.567322 | 42.82 | 0.57309 |
| 37 | 905.88105 | 7.500 | | | |
| 38 | 1284.12207 | 2.573 | 1.804000 | 46.53 | 0.55775 |
| 39 | −109.09985 | 2.000 | 1.805181 | 25.42 | 0.61616 |
| 40 | −9005.24276 | 2.481 | | | |
| 41 | −95.47382 | 6.235 | 1.749505 | 35.33 | 0.58189 |
| 42 | −25.96179 | 0.885 | 1.717004 | 47.93 | 0.56062 |
| 43 | 40.35994 | 15.010 | 1.518229 | 58.90 | 0.54567 |
| 44 | −82.26735 | 0.730 | | | |
| 45 | 51.46806 | 3.925 | 1.846660 | 23.78 | 0.62054 |
| 46 | 69.32553 | 16.419 | | | |
| 47 | 562.41538 | 19.985 | 1.568832 | 56.36 | 0.54890 |
| 48 | −92.64291 | 1.190 | | | |
| 49 | 88.31713 | 11.717 | 1.568832 | 56.36 | 0.54890 |
| 50 | −56.75558 | 0.875 | 1.910823 | 35.25 | 0.58224 |
| 51 | 101.81604 | 0.976 | | | |
| 52 | 91.40555 | 5.878 | 1.438750 | 94.66 | 0.53402 |
| 53 | −54.68374 | 0.969 | | | |
| 54 | 152.37116 | 5.561 | 1.672700 | 32.10 | 0.59891 |
| 55 | −44.68980 | 0.875 | 1.903658 | 31.31 | 0.59481 |
| 56 | 1213.00724 | 0.250 | | | |
| 57 | ∞ | 1.000 | 1.516330 | 64.14 | 0.53531 |
| 58 | ∞ | 0.000 | | | |
| 59 | ∞ | 63.100 | 1.608631 | 46.60 | 0.56787 |
| 60 | ∞ | 8.500 | 1.516330 | 64.06 | 0.53479 |
| 61 | ∞ | 31.128 | | | |

TABLE 2

Example 1: Specifications (at d line)

|  | Wide Angle End | Intermediate | Telephoto End |
|---|---|---|---|
| Zoom Magnification | 1.0 | 17.3 | 44.1 |
| f | 15.545 | 269.191 | 685.527 |
| FNo. | 2.65 | 2.65 | 4.08 |
| 2ω [°] | 65.2 | 4.0 | 1.6 |

TABLE 3

Example 1: Variable Surface Distance

|  | Wide Angle End | Intermediate | Telephoto End |
|---|---|---|---|
| DD [10] | 3.654 | 165.197 | 180.163 |
| DD [20] | 291.030 | 56.768 | 2.597 |
| DD [22] | 2.632 | 12.104 | 4.896 |
| DD [30] | 3.068 | 66.315 | 112.728 |

TABLE 4

Example 1: Aspheric coefficients

| | Surface Number | | |
|---|---|---|---|
|  | 11 | 22 | 26 |
| KA | 6.1978006E+00 | 9.9811835E−01 | 8.2319259E−01 |
| A4 | −1.4915236E−07 | 5.2907942E−08 | −4.0509620E−07 |
| A6 | 6.4827892E−11 | −1.2354133E−11 | −2.9427118E−11 |
| A8 | −1.4741822E−13 | 4.2784259E−14 | 7.2110843E−14 |
| A10 | −1.2435995E−15 | 2.6139930E−16 | 5.3167732E−17 |
| A12 | 9.0133614E−18 | −1.0584003E−18 | −3.8116634E−19 |
| A14 | −2.4647889E−20 | 1.7619520E−21 | 5.5059948E−22 |
| A16 | 3.3970964E−23 | −1.5486781E−24 | −3.3979539E−25 |
| A18 | −2.3532161E−26 | 7.0338723E−28 | 7.5180737E−29 |
| A20 | 6.5242517E−30 | −1.2968942E−31 | 2.3751904E−33 |

Figure 6:
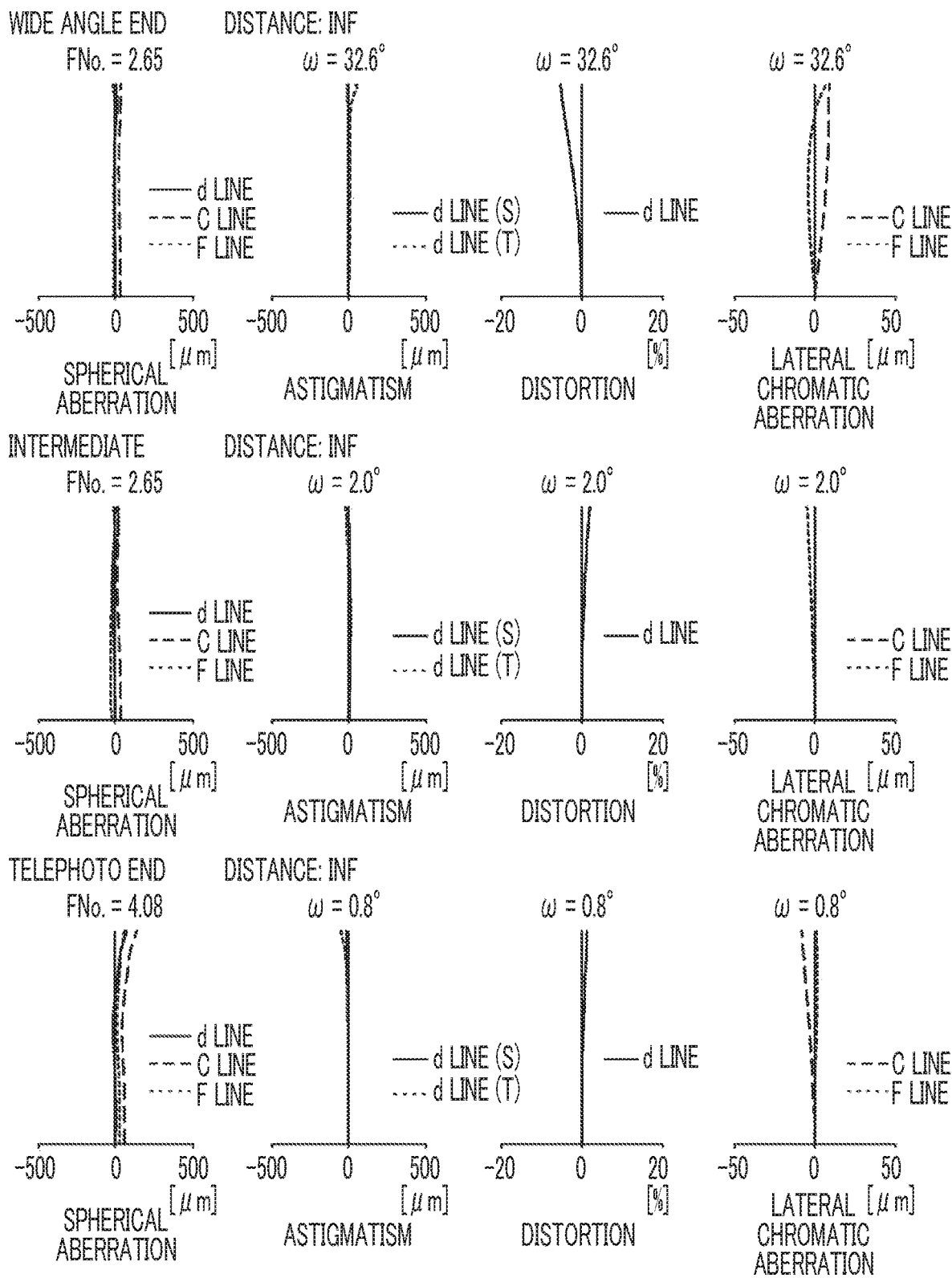
FIG. 6 is a diagram of aberrations of the zoom lens of Example 1 of the present invention.

FIG. 6 shows aberration diagrams in a state where an object at infinity is brought into focus through the zoom lens of Example 1. In FIG. 6, from the left in an upper row, spherical aberration, astigmatism, distortion, and lateral chromatic aberration (chromatic aberration of magnification) at a wide angle end are shown, from the left in a middle row, spherical aberration, astigmatism, distortion, and lateral chromatic aberration (chromatic aberration of magnification) at an intermediate position are shown, and from the left in a lower row, spherical aberration, astigmatism, distortion, and lateral chromatic aberration (chromatic aberration of magnification) at the telephoto end are shown.

In the spherical aberration diagram, aberrations at the d line (a wavelength of 587.56 nm), the C line (a wavelength of 656.27 nm), and the F line (a wavelength of 486.13 nm) are respectively indicated by the solid line, the long dashed line, and the short dashed line. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration, aberrations at the C line and the F line are respectively indicated by the long dashed line and the short dashed line. In the spherical aberration diagram, FNo. indicates an F number. In the other aberration diagrams, w indicates a half angle of view.

In the description of Example 1, reference signs, meanings, and description methods of the respective data pieces are the same as those in the Examples 2 to 5 described below unless otherwise noted. Therefore, in the following description, repeated description will be omitted.

Example 2

Figure 2:
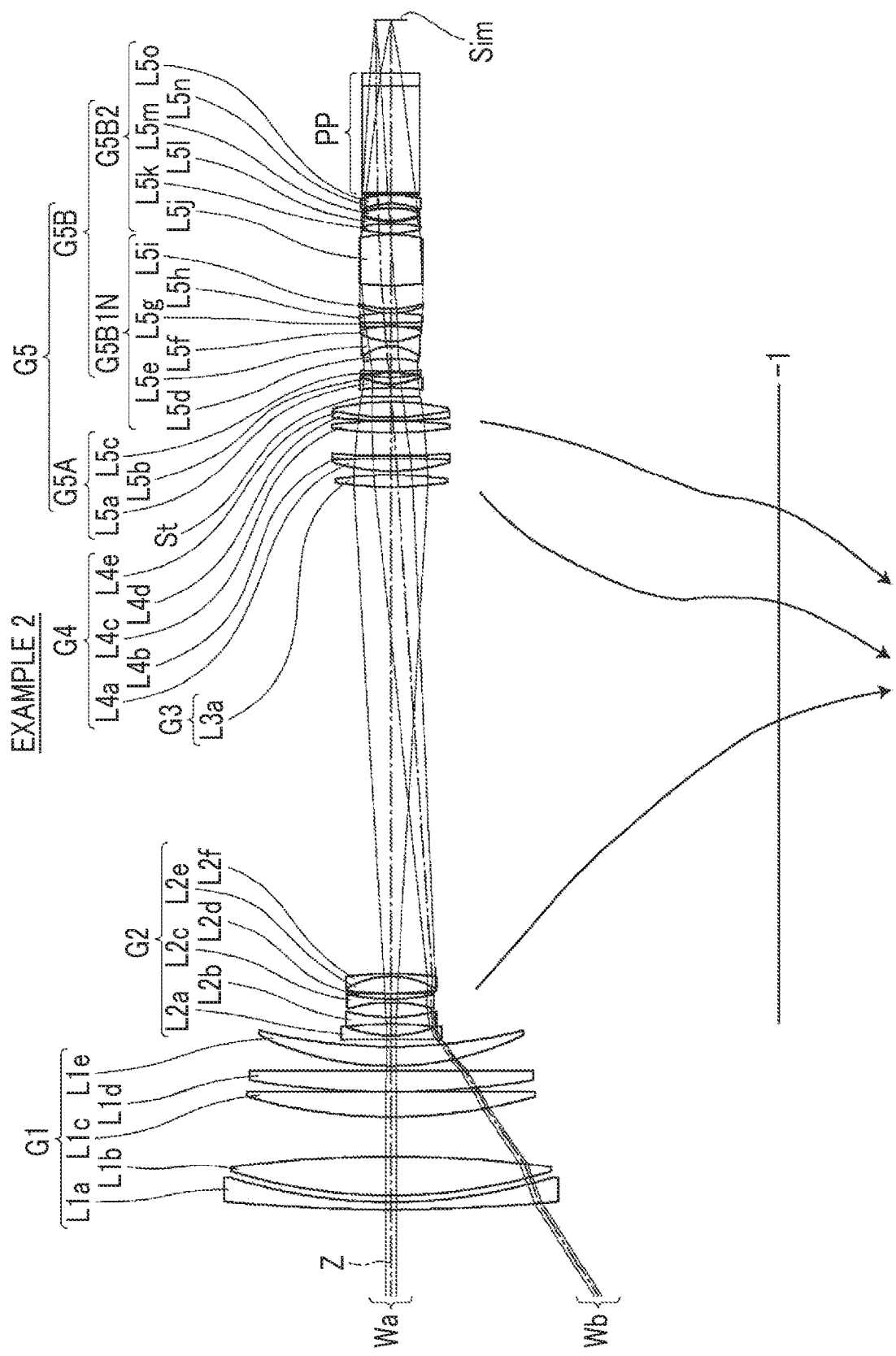
FIG. 2 is a cross-sectional view illustrating a composition of a zoom lens of Example 2 of the present invention.
Figure 7:
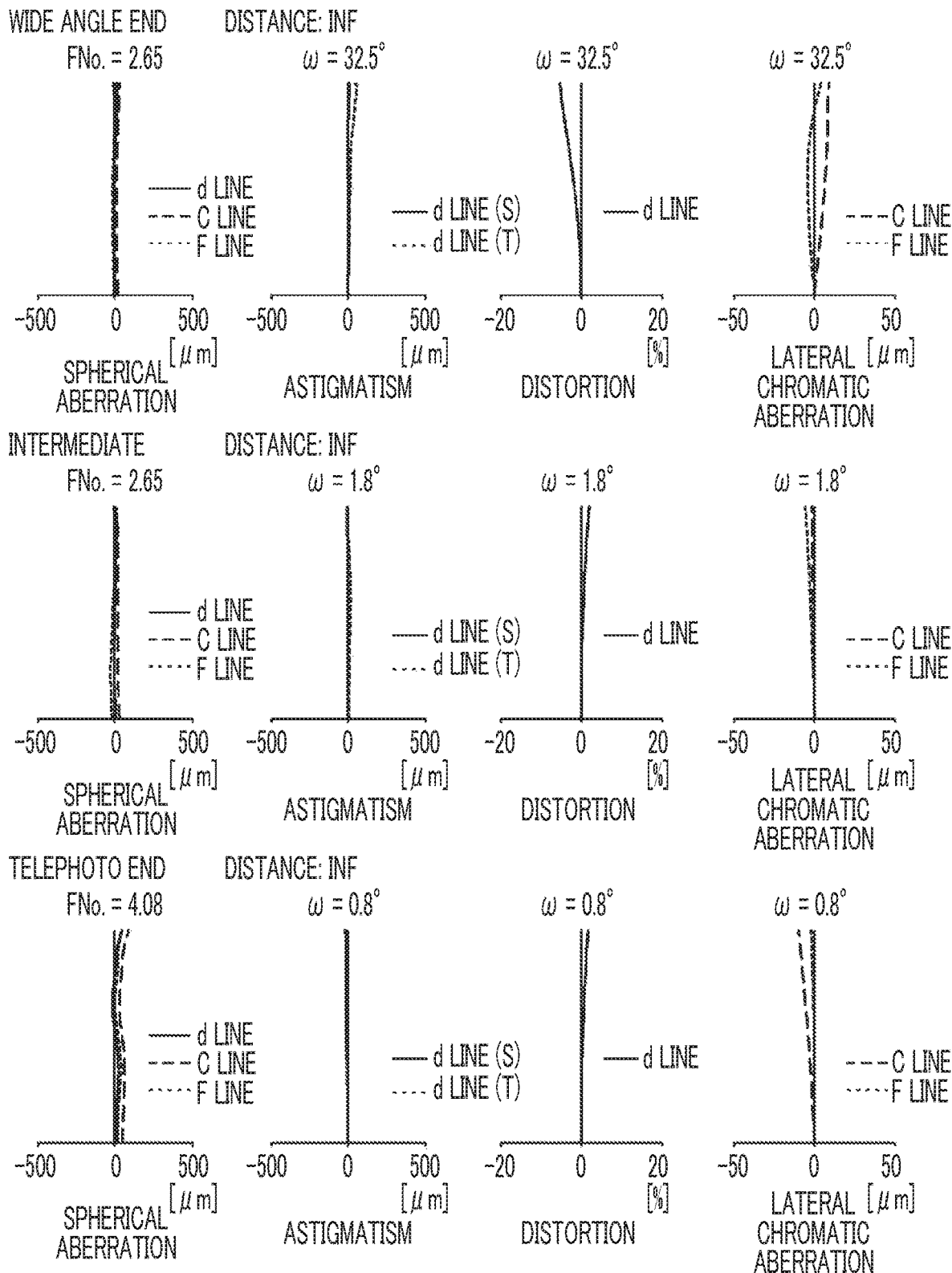
FIG. 7 is a diagram of aberrations of the zoom lens of Example 2 of the present invention.

The composition of a zoom lens of Example 2 is shown in FIG. 2. The number of lenses of the zoom lens of Example 2 is the same as that of Example 1. For the zoom lens of Example 2, Table 5A and Table 5B show basic lens data, Table 6 shows data on specifications, Table 7 shows data on variable surface distance, Table 8 shows data on aspheric coefficients, and FIG. 7 shows respective aberration diagrams.

TABLE 5A

Example 2: Lens Data (n, ν at d Line)

| Surface Number | Curvature Radius | Surface Distance | n | ν | θgF |
|---|---|---|---|---|---|
| 1 | 1010.82919 | 4.400 | 1.834000 | 37.21 | 0.58082 |
| 2 | 314.18551 | 3.893 |  |  |  |
| 3 | 312.44099 | 23.165 | 1.433871 | 95.18 | 0.53733 |
| 4 | −709.00335 | 23.401 |  |  |  |
| 5 | 298.42207 | 14.713 | 1.433871 | 95.18 | 0.53733 |
| 6 | ∞ | 0.120 |  |  |  |
| 7 | 496.60605 | 12.500 | 1.433871 | 95.18 | 0.53733 |
| 8 | ∞ | 2.848 |  |  |  |
| 9 | 173.16371 | 11.480 | 1.438750 | 94.94 | 0.53433 |
| 10 | 323.14342 | DD [10] |  |  |  |
| *11 | 3780647.12969 | 2.417 | 2.000694 | 25.46 | 0.61364 |
| 12 | 72.16280 | 6.691 |  |  |  |
| 13 | −222.49576 | 4.165 | 1.882997 | 40.76 | 0.56679 |
| 14 | 103.81228 | 8.626 |  |  |  |
| 15 | −90.28364 | 2.033 | 1.733997 | 51.47 | 0.54874 |
| 16 | 126.97156 | 3.091 | 1.892860 | 20.36 | 0.63944 |
| 17 | 544.32352 | 0.182 |  |  |  |
| 18 | 221.85553 | 10.140 | 1.805181 | 25.42 | 0.61616 |
| 19 | −50.66805 | 1.610 | 1.804000 | 46.53 | 0.55775 |
| 20 | −192.25619 | DD [20] |  |  |  |
| 21 | 215.06832 | 7.042 | 1.437001 | 95.10 | 0.53364 |
| *22 | −222.68472 | DD [22] |  |  |  |
| 23 | 115.43659 | 7.336 | 1.437001 | 95.10 | 0.53364 |
| 24 | −811.68645 | 1.885 | 1.592701 | 35.31 | 0.59336 |
| 25 | 513.39583 | 13.736 |  |  |  |
| *26 | 184.14430 | 7.001 | 1.437001 | 95.10 | 0.53364 |
| 27 | −291.51132 | 0.121 |  |  |  |
| 28 | 393.49464 | 1.875 | 1.846660 | 23.78 | 0.62054 |
| 29 | 157.82538 | 9.209 | 1.437001 | 95.10 | 0.53364 |
| 30 | −141.70374 | DD [30] |  |  |  |

TABLE 5B

Example 2: Lens Data (n, ν at d Line)

| Surface Number | Curvature Radius | Surface Distance | n | ν | θgF |
|---|---|---|---|---|---|
| 31 (stop) | ∞ | 5.213 |  |  |  |
| 32 | −144.91615 | 2.094 | 1.618000 | 63.33 | 0.54414 |
| 33 | 43.22496 | 0.137 |  |  |  |
| 34 | 40.38876 | 3.771 | 1.805181 | 25.42 | 0.61616 |
| 35 | 85.11634 | 2.602 |  |  |  |
| 36 | −142.15566 | 0.875 | 1.550323 | 75.50 | 0.54001 |
| 37 | 217.03316 | 7.689 |  |  |  |
| 38 | −74.23921 | 7.173 | 1.819510 | 45.69 | 0.55921 |
| 39 | −26.00835 | 2.881 | 1.740465 | 52.64 | 0.54778 |
| 40 | 37.72655 | 9.014 | 1.537492 | 48.80 | 0.56297 |
| 41 | −71.54594 | 0.123 |  |  |  |
| 42 | −388.06439 | 1.764 | 1.846660 | 23.78 | 0.62054 |
| 43 | 280.58003 | 5.625 | 1.851500 | 40.78 | 0.56958 |
| 44 | −172.29265 | 0.120 |  |  |  |
| 45 | 44.47728 | 2.587 | 1.560497 | 44.65 | 0.57051 |
| 46 | 58.77914 | 13.825 |  |  |  |
| 47 | 183.85643 | 30.156 | 1.487490 | 70.24 | 0.53007 |
| 48 | −78.39629 | 0.711 |  |  |  |
| 49 | 61.49689 | 5.735 | 1.560721 | 52.12 | 0.55549 |

TABLE 5B-continued

Example 2: Lens Data (n, ν at d Line)

| | | | | | |
|---|---|---|---|---|---|
| 50 | −84.77847 | 0.970 | 1.815520 | 46.43 | 0.55773 |
| 51 | 42.88562 | 1.000 | | | |
| 52 | 45.65338 | 7.514 | 1.438750 | 94.66 | 0.53402 |
| 53 | −51.60602 | 0.120 | | | |
| 54 | −68.39834 | 2.473 | 1.559088 | 43.92 | 0.57205 |
| 55 | −43.08993 | 5.000 | 1.903658 | 31.31 | 0.59481 |
| 56 | −75.74559 | 0.250 | | | |
| 57 | ∞ | 1.000 | 1.516330 | 64.14 | 0.53531 |
| 58 | ∞ | 0.000 | | | |
| 59 | ∞ | 63.100 | 1.608631 | 46.60 | 0.56787 |
| 60 | ∞ | 8.500 | 1.516330 | 64.06 | 0.53479 |
| 61 | ∞ | 31.220 | | | |

TABLE 6

Example 2: Specifications (at d line)

| | Wide Angle End | Intermediate | Telephoto End |
|---|---|---|---|
| Zoom Magnification | 1.0 | 18.6 | 44.1 |
| f | 15.543 | 289.621 | 685.467 |
| FNo. | 2.65 | 2.65 | 4.08 |
| 2ω [°] | 65.0 | 3.6 | 1.6 |

TABLE 7

Example 2: Variable Surface Distance

| | Wide Angle End | Intermediate | Telephoto End |
|---|---|---|---|
| DD [10] | 4.093 | 171.527 | 184.962 |
| DD [20] | 288.050 | 50.480 | 2.645 |
| DD [22] | 2.748 | 10.919 | 2.644 |
| DD [30] | 3.175 | 65.139 | 107.814 |

TABLE 8

Example 2: Aspheric coefficients

| | Surface Number | | |
|---|---|---|---|
| | 11 | 22 | 26 |
| KA | 6.1978006E+00 | 9.9811835E−01 | 8.2319259E−01 |
| A4 | −5.6179641E−08 | 3.8716579E−08 | −4.0137341E−07 |
| A6 | 2.1256666E−10 | 9.6700213E−11 | −2.6592637E−11 |
| A8 | −6.7224391E−13 | −3.4721244E−13 | 2.5511860E−13 |
| A10 | −5.2017806E−16 | 1.0051913E−15 | −1.0048594E−15 |
| A12 | 9.8067854E−18 | −1.9946647E−18 | 2.2076966E−18 |
| A14 | −2.9533599E−20 | 2.5896349E−21 | −2.8835336E−21 |
| A16 | 4.2217045E−23 | −2.0299096E−24 | 2.2521165E−24 |
| A18 | −3.0055552E−26 | 8.5805728E−28 | −9.7464057E−28 |
| A20 | 8.5743244E−30 | −1.4884778E−31 | 1.7972641E−31 |

Example 3

Figure 3:
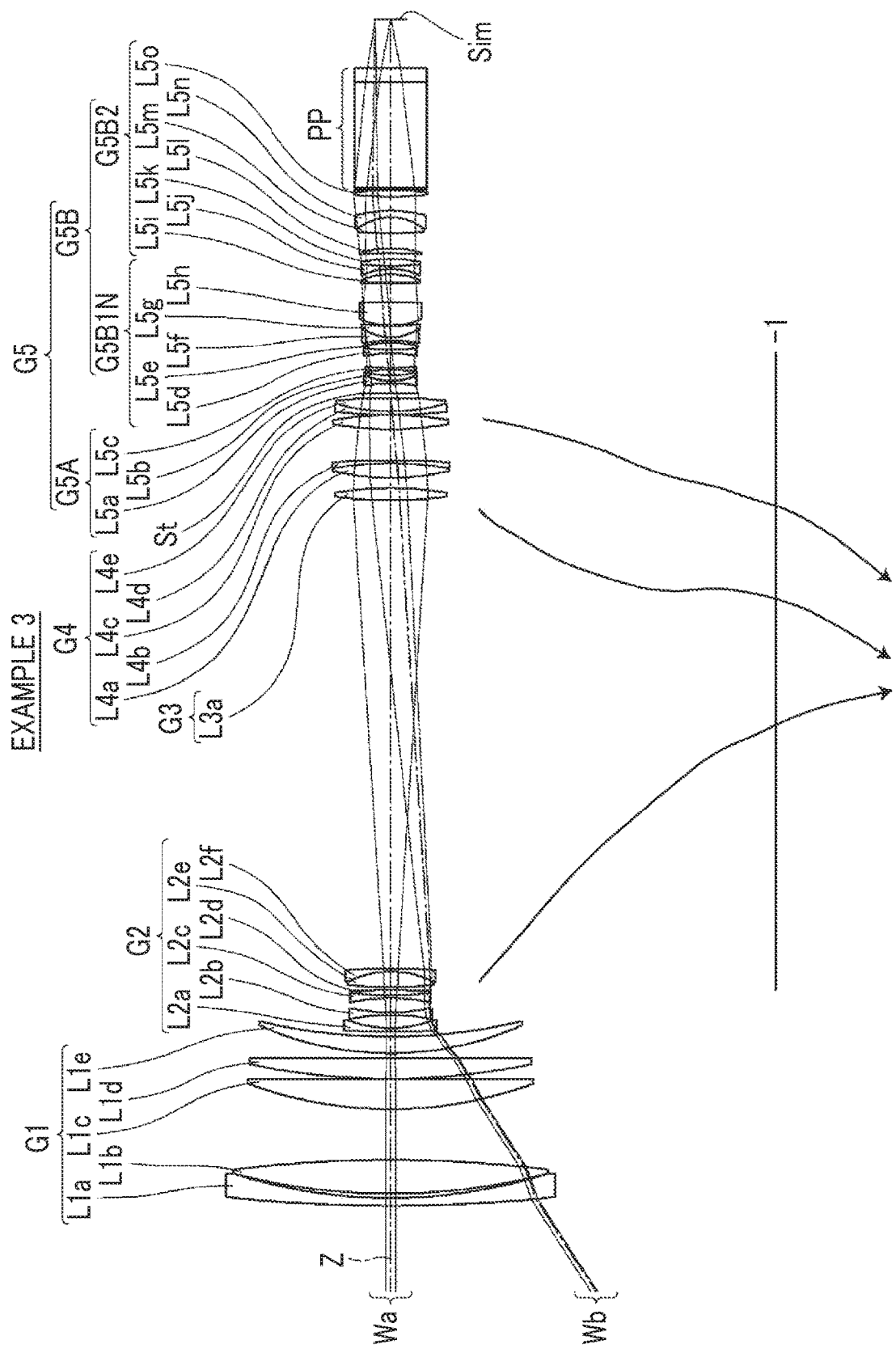
FIG. 3 is a cross-sectional view illustrating a composition of a zoom lens of Example 3 of the present invention.

The composition of a zoom lens of Example 3 is shown in FIG. 3. The zoom lens of Example 3 is composed of, in order from the object side to the image side along the optical axis Z, a first lens group G1 consisting of five lenses L1a to L1e, a second lens group G2 consisting of six lenses L2a to L2f, a third lens group G3 consisting of only one lens L3a, a fourth lens group G4 consisting of five lenses L4a to L4e, and a fifth lens group G5 consisting of fifteen lenses L5a to L5o.

The fifth lens group G5 is composed of, in order from the object side to the image side along the optical axis Z, a fifth A lens group G5A consisting of three lenses L5a to L5c, a fifth B1N lens group G5B1N consisting of five lenses L5d to L5h, and a fifth B2 lens group G5B2 consisting of seven lenses L5i to L5o.

Figure 8:
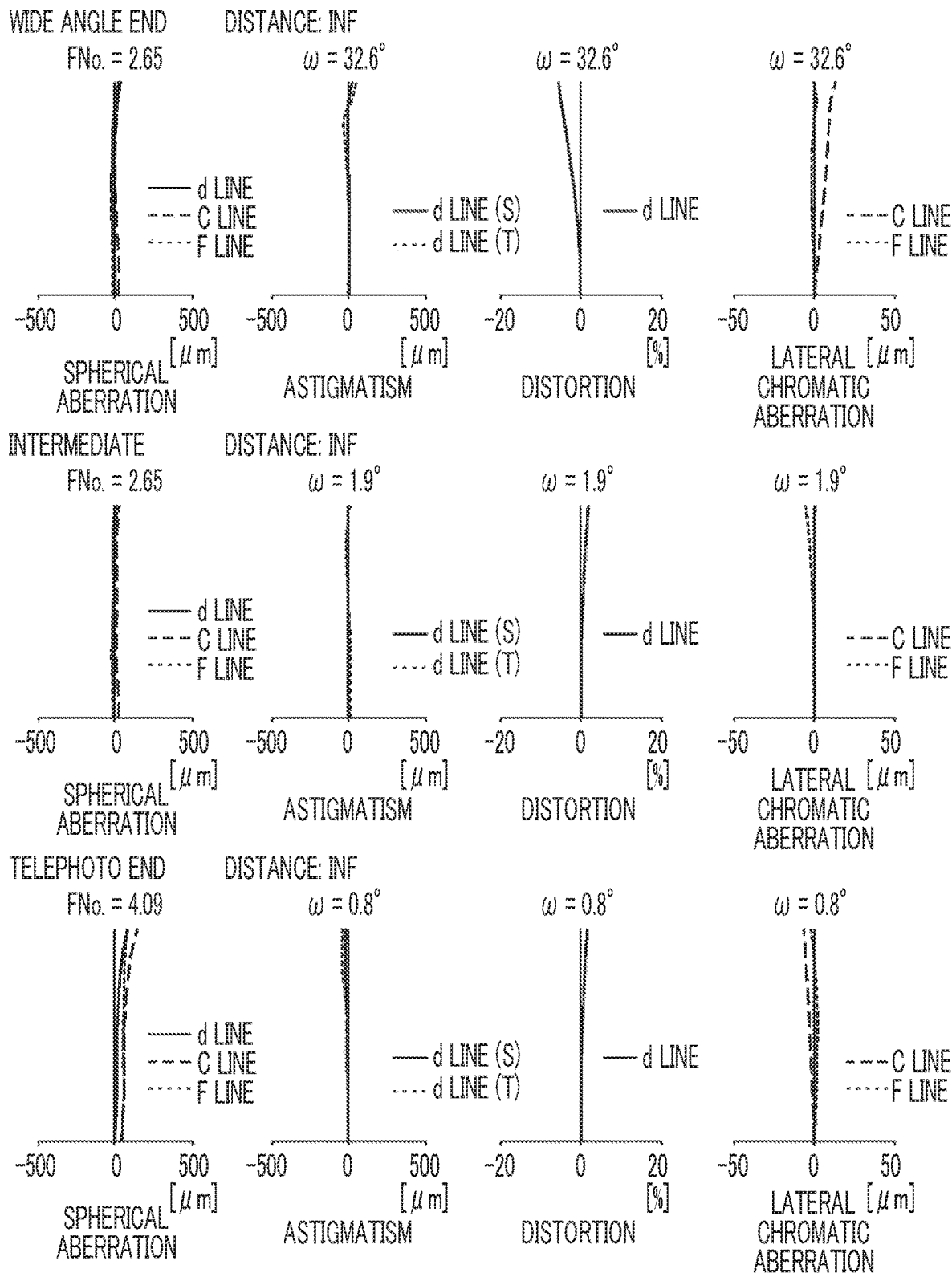
FIG. 8 is a diagram of aberrations of the zoom lens of Example 3 of the present invention.

For the zoom lens of Example 3, Table 9A and Table 9B show basic lens data, Table 10 shows data on specifications, Table 11 shows data on variable surface distance, Table 12 shows data on aspheric coefficients, and FIG. 8 shows respective aberration diagrams.

TABLE 9A

Example 3: Lens Data (n, ν at d Line)

| Surface Number | Curvature Radius | Surface Distance | n | ν | θgF |
|---|---|---|---|---|---|
| 1 | 949.72996 | 4.400 | 1.834000 | 37.16 | 0.57759 |
| 2 | 303.16102 | 2.500 | | | |
| 3 | 364.21944 | 20.236 | 1.433871 | 95.18 | 0.53733 |
| 4 | −759.94440 | 30.000 | | | |
| 5 | 240.02194 | 17.875 | 1.433871 | 95.18 | 0.53733 |
| 6 | ∞ | 0.120 | | | |
| 7 | 394.49931 | 12.500 | 1.433871 | 95.18 | 0.53733 |
| 8 | ∞ | 2.833 | | | |
| 9 | 186.76251 | 10.000 | 1.438750 | 94.94 | 0.53433 |
| 10 | 322.84695 | DD[10] | | | |
| *11 | 4128.04047 | 2.000 | 2.000694 | 25.46 | 0.61364 |
| 12 | 69.79436 | 7.728 | | | |
| 13 | −126.31513 | 1.600 | 1.910823 | 35.25 | 0.58224 |
| 14 | 111.08243 | 8.406 | | | |
| 15 | −106.42747 | 1.610 | 1.752017 | 52.80 | 0.54707 |
| 16 | 224.36230 | 3.349 | 1.892860 | 20.36 | 0.63944 |
| 17 | −345.87494 | 1.704 | | | |
| 18 | 291.27970 | 9.209 | 1.841390 | 24.56 | 0.61274 |
| 19 | −54.73334 | 1.610 | 1.816000 | 46.62 | 0.55682 |
| 20 | −449.77604 | DD[20] | | | |
| 21 | 254.32836 | 7.188 | 1.496999 | 81.54 | 0.53748 |
| *22 | −197.52686 | DD[22] | | | |
| 23 | 137.20244 | 9.058 | 1.437001 | 95.10 | 0.53364 |
| 24 | −194.44366 | 2.000 | 1.749642 | 27.52 | 0.61062 |
| 25 | −391.82751 | 18.307 | | | |
| *26 | 179.04081 | 8.299 | 1.437001 | 95.10 | 0.53364 |
| 27 | −202.16909 | 0.123 | | | |
| 28 | 306.94185 | 2.000 | 1.800000 | 29.84 | 0.60178 |
| 29 | 112.00622 | 8.010 | 1.437001 | 95.10 | 0.53364 |
| 30 | −371.83757 | DD[30] | | | |

TABLE 9B

Example 3: Lens Data (n, ν at d Line)

| | | | | | |
|---|---|---|---|---|---|
| 31(stop) | ∞ | 5.648 | | | |
| 32 | −98.79990 | 1.500 | 1.493152 | 81.05 | 0.53644 |
| 33 | 38.94729 | 0.120 | | | |
| 34 | 35.60333 | 3.040 | 1.805181 | 25.42 | 0.61616 |
| 35 | 56.14421 | 3.335 | | | |
| 36 | −169.56158 | 1.500 | 1.595220 | 67.73 | 0.54426 |
| 37 | 200.65450 | 8.346 | | | |
| 38 | −87.95564 | 2.010 | 1.816000 | 46.62 | 0.55682 |
| 39 | 83.42062 | 4.493 | 1.841390 | 24.56 | 0.61274 |
| 40 | −88.05192 | 1.254 | | | |
| 41 | −118.28690 | 2.000 | 1.834807 | 42.72 | 0.56486 |
| 42 | 28.09269 | 7.093 | 1.777833 | 50.22 | 0.55078 |
| 43 | 157.67171 | 0.120 | | | |
| 44 | 45.65290 | 13.716 | 1.696935 | 56.65 | 0.54335 |
| 45 | −405.18024 | 11.500 | | | |
| 46 | 401.31152 | 5.095 | 1.487490 | 70.24 | 0.53007 |
| 47 | −48.07895 | 3.355 | | | |
| 48 | −40.14819 | 1.600 | 1.910823 | 35.25 | 0.58224 |
| 49 | 135.05535 | 4.121 | 1.496999 | 81.54 | 0.53748 |
| 50 | −90.11275 | 3.606 | | | |
| 51 | −222.69234 | 2.892 | 1.487490 | 70.24 | 0.53007 |
| 52 | −68.26309 | 8.899 | | | |
| 53 | 182.07461 | 9.381 | 1.487490 | 70.24 | 0.53007 |
| 54 | −32.09939 | 4.093 | 1.910823 | 35.25 | 0.58224 |
| 55 | −75.85874 | 8.238 | | | |

TABLE 9B-continued

Example 3: Lens Data (n, ν at d Line)

| | | | | | |
|---|---|---|---|---|---|
| 56 | 177.87033 | 4.107 | 1.910823 | 35.25 | 0.58224 |
| 57 | −158.53145 | 0.250 | | | |
| 58 | ∞ | 1.000 | 1.516330 | 64.14 | 0.53531 |
| 59 | ∞ | 0.000 | | | |
| 60 | ∞ | 63.100 | 1.608631 | 46.60 | 0.56787 |
| 61 | ∞ | 8.500 | 1.516330 | 64.06 | 0.53479 |
| 62 | ∞ | 29.465 | | | |

TABLE 10

Example 3: Specifications (at d line)

| | Wide Angle End | Intermediate | Telephoto End |
|---|---|---|---|
| Zoom Magnification | 1.0 | 18.2 | 44.1 |
| f | 15.549 | 282.710 | 685.712 |
| FNo. | 2.65 | 2.65 | 4.09 |
| 2ω[°] | 65.2 | 3.8 | 1.6 |

TABLE 11

Example 3: Variable Surface Distance

| | Wide Angle End | Intermediate | Telephoto End |
|---|---|---|---|
| DD[10] | 3.279 | 166.946 | 180.801 |
| DD[20] | 278.931 | 52.489 | 2.964 |
| DD[22] | 6.195 | 8.513 | 2.972 |
| DD[30] | 3.018 | 63.476 | 104.686 |

TABLE 12

Example 3: Aspheric coefficients

| | Surface Number | | |
|---|---|---|---|
| | 11 | 22 | 26 |
| KA | 8.0000977E−01 | 1.0413527E+00 | 7.9999990E−01 |
| A4 | 5.7832161E−08 | 5.5220614E−08 | −2.6916365E−07 |
| A6 | 3.9726388E−10 | 3.5892239E−11 | −2.7313862E−11 |
| A8 | −3.4072731E−12 | 1.0853459E−13 | 2.7559820E−13 |
| A10 | 1.9169802E−14 | −8.1958665E−16 | −1.1625859E−15 |
| A12 | −6.8473733E−17 | 2.0473886E−18 | 2.5103532E−18 |
| A14 | 1.5307151E−19 | −2.7160543E−21 | −3.0981394E−21 |
| A16 | −2.0605410E−22 | 2.0381564E−24 | 2.2052836E−24 |
| A18 | 1.5159902E−25 | −8.1353541E−28 | −8.3752246E−28 |
| A20 | −4.6615381E−29 | 1.3360156E−31 | 1.3020337E−31 |

Example 4

Figure 4:
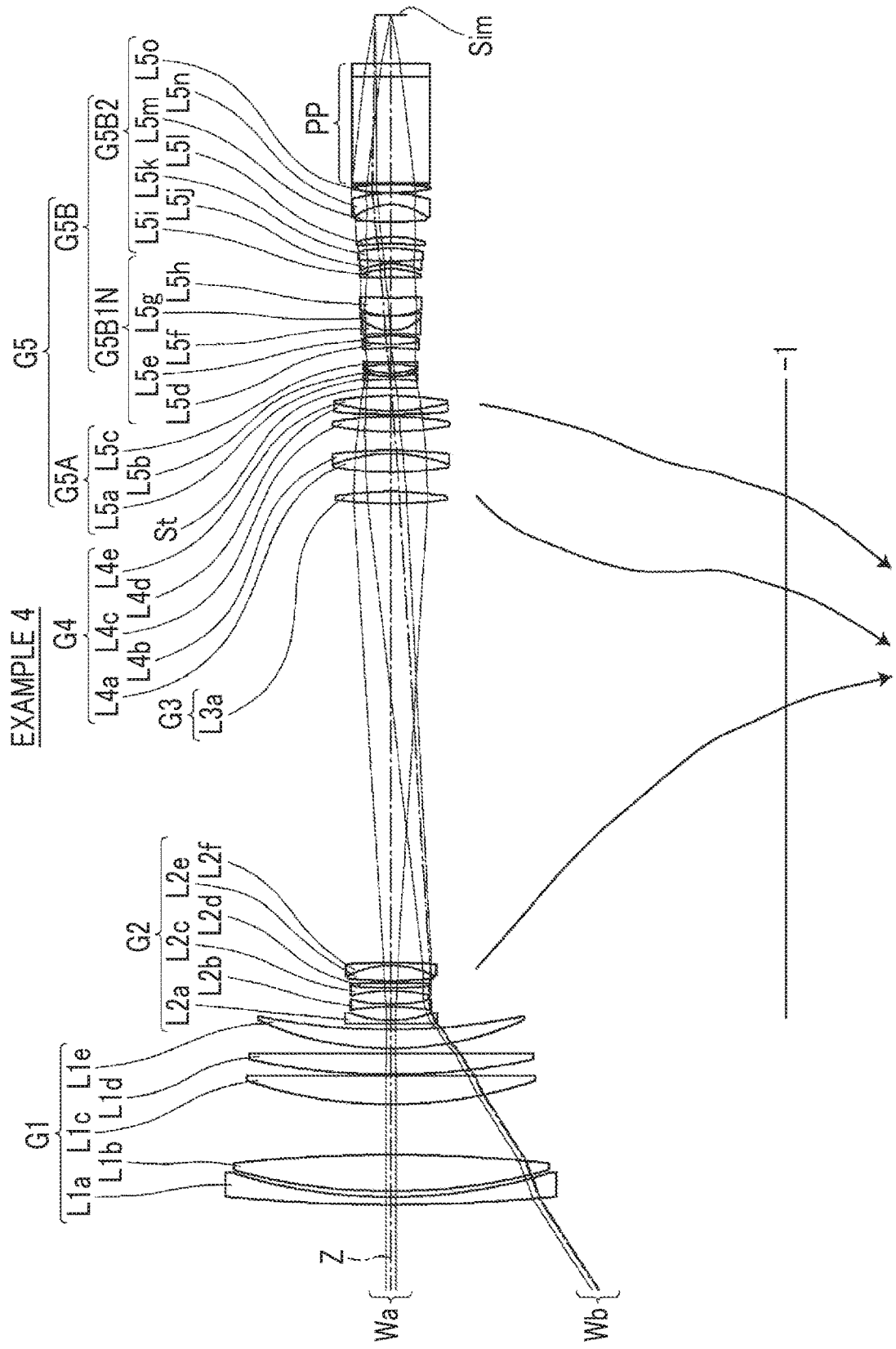
FIG. 4 is a cross-sectional view illustrating a composition of a zoom lens of Example 4 of the present invention.
Figure 9:
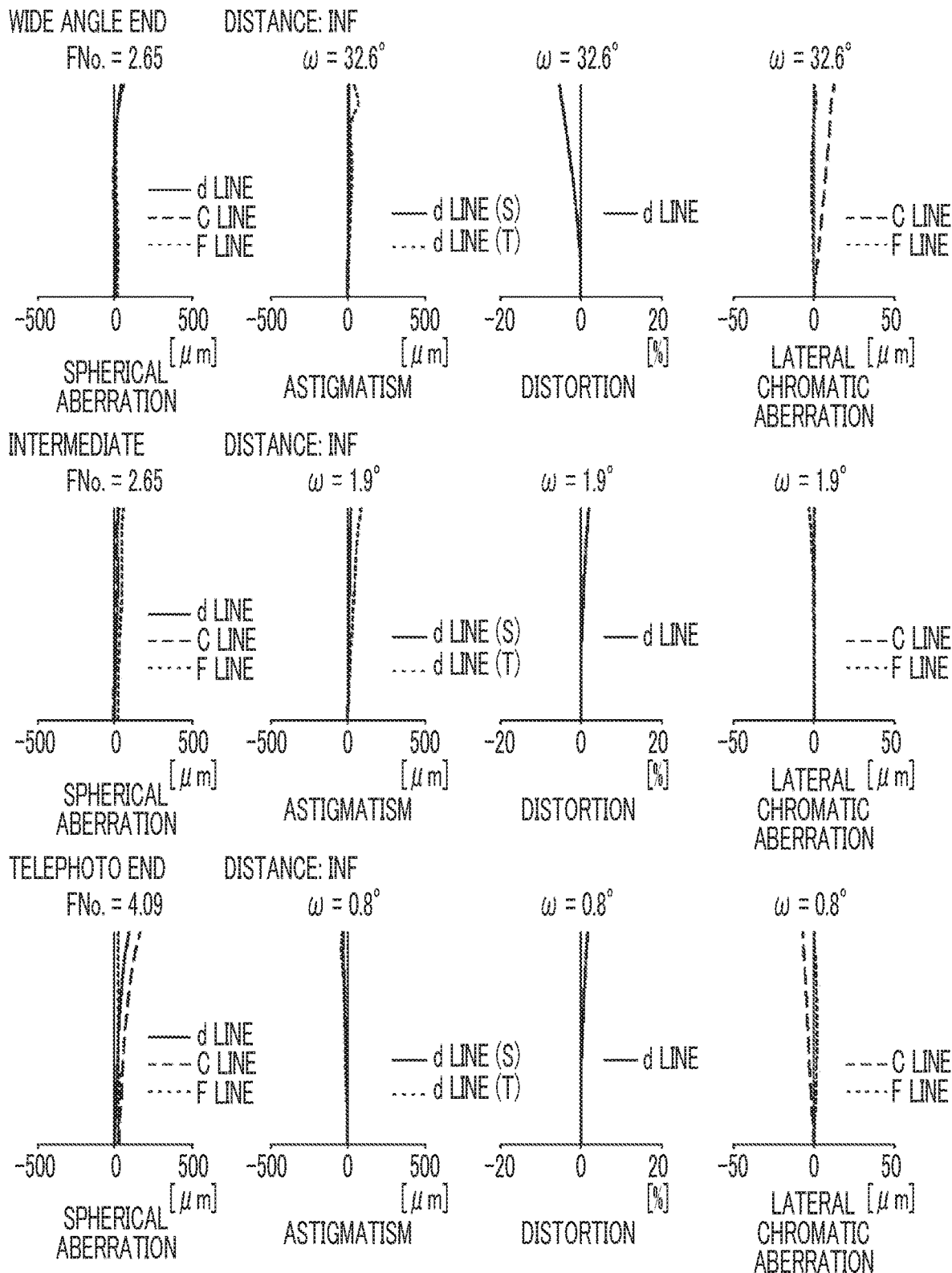
FIG. 9 is a diagram of aberrations of the zoom lens of Example 4 of the present invention.

The composition of a zoom lens of Example 4 is shown in FIG. 4. The number of lenses of the zoom lens of Example 4 is the same as that of Example 3. For the zoom lens of Example 4, Table 13A and Table 13B show basic lens data, Table 14 shows data on specifications, Table 15 shows data on variable surface distance, Table 16 shows data on aspheric coefficients, and FIG. 9 shows respective aberration diagrams.

TABLE 13A

Example 4: Lens Data (n, ν at d Line)

| Surface Number | Curvature Radius | Surface Distance | n | ν | θgF |
|---|---|---|---|---|---|
| 1 | 1035.60297 | 4.400 | 1.834000 | 37.16 | 0.57759 |
| 2 | 310.41806 | 3.430 | | | |
| 3 | 347.25888 | 21.723 | 1.433871 | 95.18 | 0.53733 |
| 4 | −897.49740 | 30.000 | | | |
| 5 | 263.47856 | 16.988 | 1.433871 | 95.18 | 0.53733 |
| 6 | ∞ | 0.825 | | | |
| 7 | 396.51014 | 12.499 | 1.433871 | 95.18 | 0.53733 |
| 8 | ∞ | 2.989 | | | |
| 9 | 186.99784 | 11.470 | 1.438750 | 94.94 | 0.53433 |
| 10 | 381.97366 | DD[10] | | | |
| *11 | 2347.18408 | 2.000 | 2.000694 | 25.46 | 0.61364 |
| 12 | 65.61557 | 8.049 | | | |
| 13 | −153.32349 | 1.600 | 1.910823 | 35.25 | 0.58224 |
| 14 | 101.36358 | 8.073 | | | |
| 15 | −91.11912 | 1.610 | 1.678075 | 57.60 | 0.54293 |
| 16 | 202.98385 | 3.072 | 1.892860 | 20.36 | 0.63944 |
| 17 | −559.59629 | 1.167 | | | |
| 18 | 249.86953 | 9.278 | 1.841390 | 24.56 | 0.61274 |
| 19 | −53.64599 | 1.610 | 1.816000 | 46.62 | 0.55682 |
| 20 | −365.67490 | DD[20] | | | |
| 21 | 251.49194 | 7.197 | 1.496999 | 81.54 | 0.53748 |
| *22 | −185.02487 | DD[22] | | | |
| 23 | 191.57262 | 11.105 | 1.437001 | 95.10 | 0.53364 |
| 24 | −91.25954 | 2.010 | 1.617722 | 49.81 | 0.56035 |
| 25 | −273.15168 | 11.154 | | | |
| *26 | 168.82888 | 9.122 | 1.437001 | 95.10 | 0.53364 |
| 27 | −181.46264 | 1.108 | | | |
| 28 | 413.82493 | 2.000 | 1.800000 | 29.84 | 0.60178 |
| 29 | 119.17296 | 9.008 | 1.437001 | 95.10 | 0.53364 |
| 30 | −207.11347 | DD[30] | | | |

TABLE 13B

Example 4: Lens Data (n, ν at d Line)

| | | | | | |
|---|---|---|---|---|---|
| 31(stop) | ∞ | 5.482 | | | |
| 32 | −130.05436 | 1.500 | 1.514267 | 64.78 | 0.53485 |
| 33 | 68.56986 | 0.120 | | | |
| 34 | 38.50227 | 1.942 | 1.805181 | 25.42 | 0.61616 |
| 35 | 45.50572 | 5.101 | | | |
| 36 | −88.81994 | 1.500 | 1.595220 | 67.73 | 0.54426 |
| 37 | 712.14985 | 8.452 | | | |
| 38 | −135.88591 | 2.010 | 1.816000 | 46.62 | 0.55682 |
| 39 | 77.53266 | 5.174 | 1.841390 | 24.56 | 0.61274 |
| 40 | −92.14078 | 1.254 | | | |
| 41 | −238.82877 | 2.000 | 1.834807 | 42.72 | 0.56486 |
| 42 | 23.86824 | 8.695 | 1.827400 | 45.26 | 0.55988 |
| 43 | 83.88639 | 0.120 | | | |
| 44 | 45.12790 | 11.008 | 1.681697 | 43.42 | 0.56889 |
| 45 | 749.03162 | 12.173 | | | |
| 46 | −2225.72565 | 4.816 | 1.487490 | 70.24 | 0.53007 |
| 47 | −48.82716 | 3.127 | | | |
| 48 | −42.25001 | 1.600 | 1.910823 | 35.25 | 0.58224 |
| 49 | 272.28529 | 7.579 | 1.496999 | 81.54 | 0.53748 |
| 50 | −86.71221 | 2.789 | | | |
| 51 | −173.99104 | 4.002 | 1.487490 | 70.24 | 0.53007 |
| 52 | −70.84685 | 8.830 | | | |
| 53 | 194.42138 | 10.421 | 1.487490 | 70.24 | 0.53007 |
| 54 | −33.80012 | 6.686 | 1.910823 | 35.25 | 0.58224 |
| 55 | −77.69021 | 0.250 | | | |
| 56 | 122.77040 | 4.974 | 1.772499 | 49.60 | 0.55212 |
| 57 | −190.84225 | 0.250 | | | |
| 58 | ∞ | 1.000 | 1.516330 | 64.14 | 0.53531 |
| 59 | ∞ | 0.000 | | | |
| 60 | ∞ | 63.100 | 1.608631 | 46.60 | 0.56787 |
| 61 | ∞ | 8.500 | 1.516330 | 64.06 | 0.53479 |
| 62 | ∞ | 28.926 | | | |

TABLE 14

Example 4: Specifications (at d line)

|  | Wide Angle End | Intermediate | Telephoto End |
|---|---|---|---|
| Zoom Magnification | 1.0 | 18.2 | 44.1 |
| f | 15.554 | 282.795 | 685.918 |
| FNo. | 2.65 | 2.65 | 4.09 |
| 2ω[°] | 65.2 | 3.8 | 1.6 |

TABLE 15

Example 4: Variable Surface Distance

|  | Wide Angle End | Intermediate | Telephoto End |
|---|---|---|---|
| DD[10] | 3.501 | 168.007 | 181.454 |
| DD[20] | 273.865 | 51.660 | 2.930 |
| DD[22] | 11.765 | 9.610 | 2.952 |
| DD[30] | 4.526 | 64.381 | 106.323 |

TABLE 16

Example 4: Aspheric coefficients

| | Surface Number | | |
|---|---|---|---|
| | 11 | 22 | 26 |
| KA | 8.0000977E−01 | 1.0413527E+00 | 7.9999990E−01 |
| A4 | −1.5016405E−08 | 1.1847184E−07 | −1.7942489E−07 |
| A6 | 2.4538441E−10 | −2.8644731E−10 | −3.0207971E−10 |
| A8 | −2.2358870E−12 | 1.2555850E−12 | 1.2481943E−12 |
| A10 | 1.3916886E−14 | −3.2018067E−15 | −3.0700747E−15 |
| A12 | −5.3997334E−17 | 5.0250106E−18 | 4.7031538E−18 |
| A14 | 1.2974425E−19 | −4.9271067E−21 | −4.5501338E−21 |
| A16 | −1.8608850E−22 | 2.9359805E−24 | 2.7087648E−24 |
| A18 | 1.4461525E−25 | −9.6683971E−28 | −9.0598276E−28 |
| A20 | −4.6615381E−29 | 1.3360156E−31 | 1.3020337E−31 |

Example 5

Figure 5:
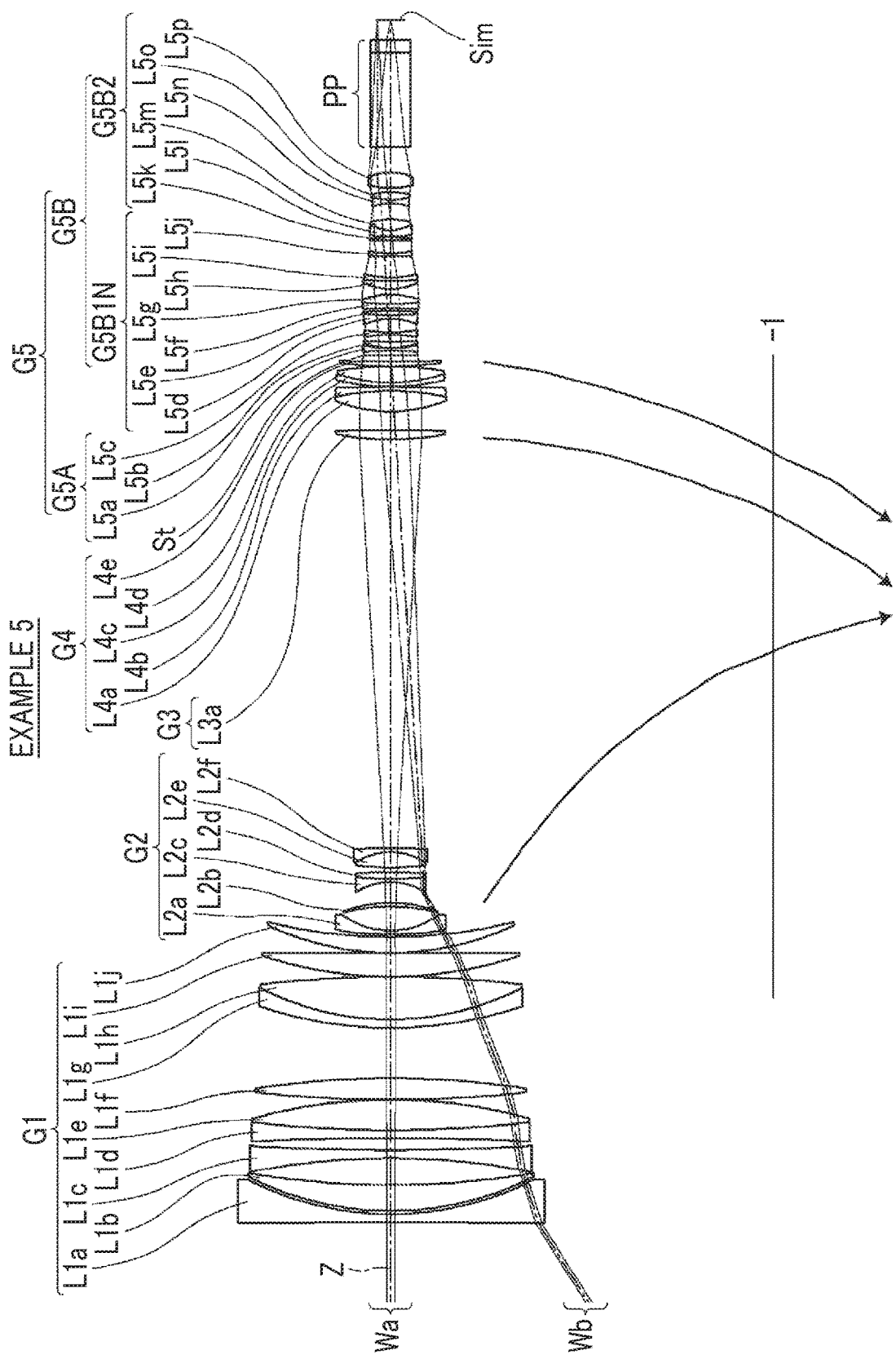
FIG. 5 is a cross-sectional view illustrating a composition of a zoom lens of Example 5 of the present invention.

Example 5 is a reference example. The composition of a zoom lens of Example 5 is shown in FIG. 5. The zoom lens of Example 5 is composed of, in order from the object side to the image side along the optical axis Z, a first lens group G1 consisting of ten lenses L1a to L1j, a second lens group G2 consisting of six lenses L2a to L2f, a third lens group G3 consisting of only one lens L3a, a fourth lens group G4 consisting of five lenses L4a to L4e, and a fifth lens group G5 consisting of sixteen lenses L5a to L5p.

The fifth lens group G5 is composed of, in order from the object side to the image side along the optical axis Z, a fifth A lens group GSA consisting of three lenses L5a to L5c, a fifth B1N lens group G5B1N consisting of seven lenses L5d to L5j, and a fifth B2 lens group G5B2 consisting of six lenses L5k to L5p.

Figure 10:
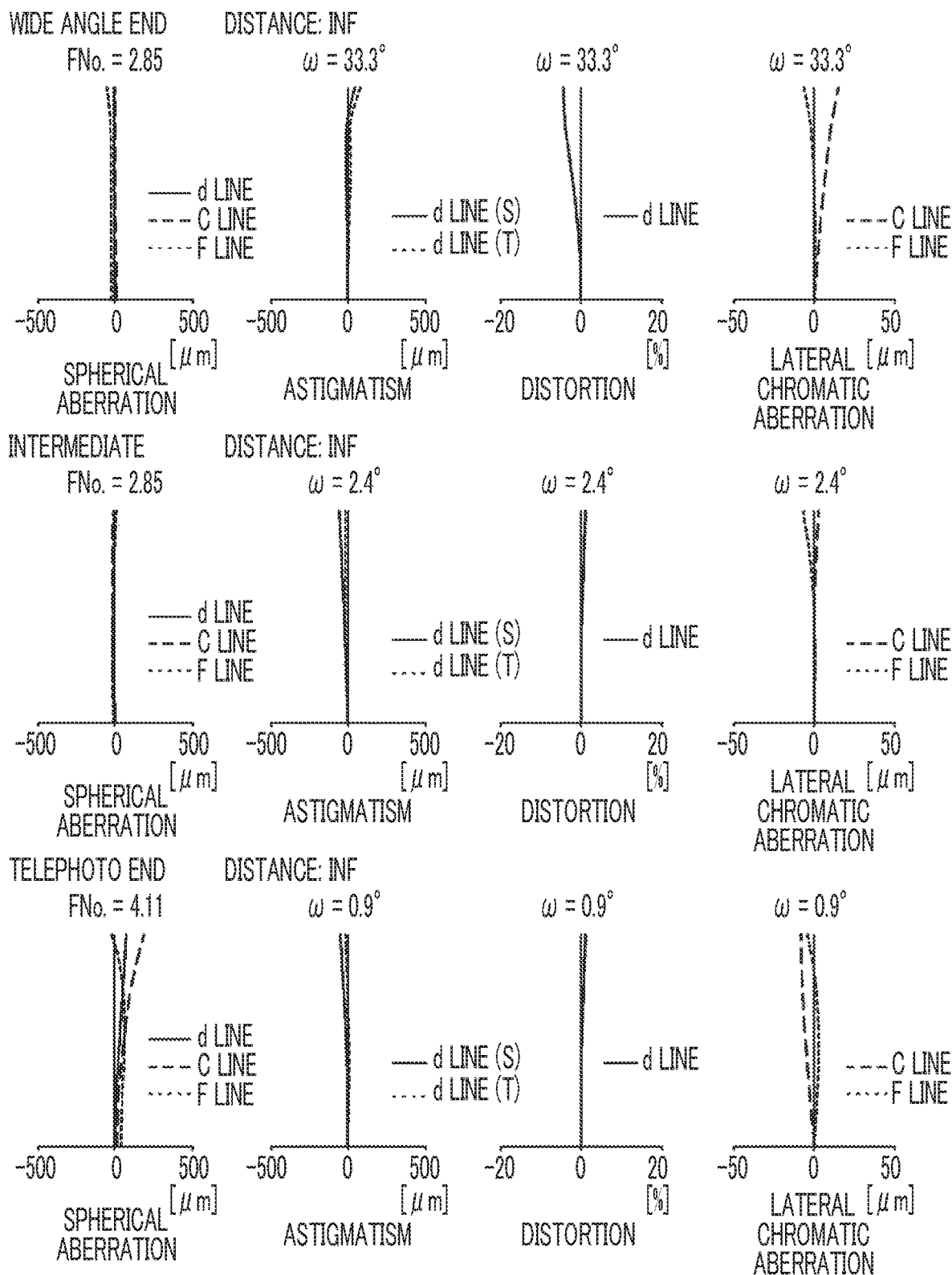
FIG. 10 is a diagram of aberrations of the zoom lens of Example 5 of the present invention.

For the zoom lens of Example 5, Table 17A and Table 17B show basic lens data, Table 18 shows data on specifications, Table 19 shows data on variable surface distance, Table 20 shows data on aspheric coefficients, and FIG. 10 shows respective aberration diagrams.

TABLE 17A

Example 5: Lens Data (n, ν at d Line)

| Surface Number | Curvature Radius | Surface Distance | n | ν | θgF |
|---|---|---|---|---|---|
| 1 | −7632.65049 | | 1.734061 | 54.59 | 0.54448 |
| 2 | 216.50596 | | | | |
| 3 | 217.01479 | 17.279 | 1.738000 | 32.33 | 0.59005 |
| 4 | 596.20637 | 18.047 | | | |
| 5 | −497.65610 | 5.500 | 1.705814 | 56.21 | 0.54354 |
| 6 | 1690.11867 | 7.595 | | | |
| 7 | −2248.25686 | 5.500 | 1.846660 | 23.78 | 0.62054 |
| 8 | 827.81885 | 20.193 | 1.438750 | 94.94 | 0.53433 |
| 9 | −363.29264 | 0.120 | | | |
| 10 | 882.94733 | 14.293 | 1.433871 | 95.18 | 0.53733 |
| 11 | −602.87856 | 33.252 | | | |
| 12 | 284.25359 | 5.500 | 1.743877 | 31.68 | 0.59809 |
| 13 | 198.62755 | 28.362 | 1.438750 | 94.94 | 0.53433 |
| 14 | −773.18353 | 0.120 | | | |
| 15 | 284.26163 | 15.571 | 1.438750 | 94.94 | 0.53433 |
| 16 | 8727.65511 | 0.120 | | | |
| 17 | 196.91473 | 10.617 | 1.810212 | 43.83 | 0.56359 |
| 18 | 347.46156 | DD[18] | | | |
| *19 | 336.38774 | 2.500 | 1.910823 | 35.25 | 0.58224 |
| 20 | 56.65520 | 16.121 | | | |
| 21 | −131.42189 | 2.500 | 1.999792 | 15.01 | 0.67764 |
| 22 | −91.51123 | 13.530 | | | |
| 23 | −46.42391 | 2.010 | 1.696551 | 55.58 | 0.54458 |
| 24 | 188.22001 | 5.010 | 1.805181 | 25.42 | 0.61616 |
| 25 | −739.49066 | 3.399 | | | |
| 26 | 199.02391 | 10.053 | 1.672700 | 32.10 | 0.59891 |
| 27 | −44.53508 | 2.500 | 1.834807 | 42.72 | 0.56486 |
| 28 | −848.41426 | DD[28] | | | |
| *29 | 306.35270 | 5.596 | 1.502626 | 72.79 | 0.53331 |
| 30 | −2283.72924 | DD[30] | | | |
| 31 | 100.86622 | 13.811 | 1.438750 | 94.94 | 0.53433 |
| 32 | −173.98797 | 2.500 | 1.800000 | 29.84 | 0.60178 |
| 33 | −745.50964 | 0.120 | | | |
| 34 | 154.83825 | 2.800 | 1.805181 | 25.42 | 0.61616 |
| 35 | 117.26381 | 10.615 | 1.437001 | 95.10 | 0.53364 |
| 36 | −244.62079 | 0.120 | | | |
| 37 | 256.92738 | 3.442 | 1.437001 | 95.10 | 0.53364 |
| *38 | −586.42491 | DD[38] | | | |

TABLE 17B

Example 5: Lens Data (n, ν at d Line)

| Surface | Curvature Radius | Surface Distance | n | ν | θgF |
|---|---|---|---|---|---|
| 39(stop) | ∞ | 3.014 | | | |
| 40 | −160.45388 | 1.500 | 1.772499 | 49.60 | 0.55212 |
| 41 | 86.02720 | 0.120 | | | |
| 42 | 57.08352 | 4.249 | 1.805181 | 25.42 | 0.61616 |
| 43 | 279.92424 | 4.603 | | | |
| 44 | −112.84794 | 1.500 | 1.487490 | 70.24 | 0.53007 |
| 45 | 95.39934 | 9.247 | | | |
| 46 | −43.24629 | 2.020 | 1.430000 | 68.12 | 0.52392 |
| 47 | 130.91224 | 3.268 | 1.674046 | 57.80 | 0.54284 |
| 48 | −151.77886 | 1.632 | | | |
| 49 | −281.61469 | 2.669 | 1.910823 | 35.25 | 0.58224 |
| 50 | 139.78228 | 6.275 | 1.778333 | 28.83 | 0.60565 |
| 51 | −64.93369 | 3.762 | | | |
| 52 | 43.50720 | 5.410 | 1.760515 | 41.11 | 0.57147 |
| 53 | 608.04908 | 2.286 | 1.851104 | 25.76 | 0.61491 |
| 54 | 75.56114 | 13.947 | | | |
| 55 | −474.98888 | 2.002 | 1.950738 | 18.84 | 0.65134 |
| 56 | 73.99916 | 8.737 | | | |
| 57 | −717.29440 | 2.000 | 1.618743 | 36.13 | 0.58837 |
| 58 | −114.06530 | 0.405 | | | |
| 59 | 93.60531 | 4.221 | 1.770309 | 50.18 | 0.55113 |
| 60 | 28.47520 | 7.631 | 1.453089 | 87.00 | 0.53241 |
| 61 | −51.46794 | 10.711 | | | |
| 62 | −31.95815 | 2.023 | 1.775012 | 49.43 | 0.55239 |
| 63 | 43.72528 | 5.377 | 1.590382 | 39.97 | 0.57912 |
| 64 | −55.17635 | 2.986 | | | |
| 65 | 101.76701 | 9.887 | 1.509762 | 78.35 | 0.53737 |
| 66 | −37.99352 | 16.824 | | | |
| 67 | ∞ | 63.100 | 1.608631 | 46.60 | 0.56787 |

TABLE 17B-continued

Example 5: Lens Data (n, ν at d Line)

| 68 | ∞ | 8.500 | 1.516329 | 64.05 | 0.53463 |
| 69 | ∞ | 13.468 | | | |

TABLE 18

Example 5: Specifications (at d line)

| | Wide Angle End | Intermediate | Telephoto End |
|---|---|---|---|
| Zoom Magnification | 1.0 | 14.7 | 39.2 |
| f | 15.155 | 222.641 | 594.059 |
| FNo. | 2.85 | 2.85 | 4.11 |
| 2ω[°] | 66.6 | 4.8 | 1.8 |

TABLE 19

Example 5: Variable Surface Distance

| | Wide Angle End | Intermediate | Telephoto End |
|---|---|---|---|
| DD[18] | 1.904 | 156.293 | 173.925 |
| DD[28] | 272.127 | 66.530 | 2.393 |
| DD[30] | 12.563 | 2.949 | 7.930 |
| DD[38] | 3.977 | 64.798 | 106.321 |

TABLE 20

Example 5: Aspheric coefficients

| | Surface Number | | |
|---|---|---|---|
| | 19 | 29 | 38 |
| KA | 1.0000000E+00 | 1.0000000E+00 | 1.0000000E+00 |
| A4 | 6.3468216E−07 | 6.0423948E−07 | 1.0970360E−06 |
| A6 | −2.2291834E−11 | −5.4811252E−11 | −2.3319145E−11 |
| A8 | 4.9229278E−14 | 3.0931766E−13 | 2.6910181E−13 |
| A10 | −6.0647917E−17 | −8.6610272E−16 | −7.1542560E−16 |
| A12 | 9.3497722E−20 | 1.5050570E−18 | 1.3205997E−18 |
| A14 | −5.6908835E−23 | −1.6540543E−21 | −1.5410539E−21 |
| A16 | 1.6854224E−26 | 1.1051942E−24 | 1.0939127E−24 |
| A18 | −1.0410250E−29 | −4.0835220E−28 | −4.2800137E−28 |
| A20 | 4.4489402E−33 | 6.3854275E−32 | 7.0559895E−32 |

Table 21 shows values corresponding to Conditional Expressions (1) to (9) of the zoom lenses of Examples 1 to 5. The values shown in Table 21 are based on the d line.

TABLE 21

| Expression Number | Conditional Expression | Example 1 | Example 2 | Example 3 | Example 4 | Example 5 |
|---|---|---|---|---|---|---|
| (1) | 1/β5A | −0.144 | −0.114 | −0.094 | −0.096 | −0.160 |
| (2) | (1 − β5A)*β5B | −1.164 | −1.195 | −1.185 | −1.191 | −1.181 |
| (3) | 1/β5 | 0.983 | 0.932 | 0.923 | 0.921 | 0.982 |
| (4) | (1/β5A)*β5B/β5 | −1.144 | −1.114 | −1.094 | −1.096 | −1.159 |
| (5) | f5A/f5 | −0.614 | −0.599 | −0.892 | −0.899 | −0.756 |
| (6) | f5A/f5B | −0.895 | −0.864 | −0.840 | −0.834 | −0.861 |
| (7) | β5B2 | −0.006 | 0.068 | 0.244 | 0.225 | −0.049 |
| (8) | f5B2/f5B1N | 0.140 | 0.210 | 0.390 | 0.352 | 0.121 |
| (9) | f5A/f5B1N | −0.104 | −0.141 | −0.277 | −0.268 | −0.127 |

From the above data, it can be seen that all the zoom lenses of Examples 1 to 5 are high image quality and high-magnification zoom lenses in which fluctuation in aberration during the anti-shake operation is suppressed.

Figure 11:
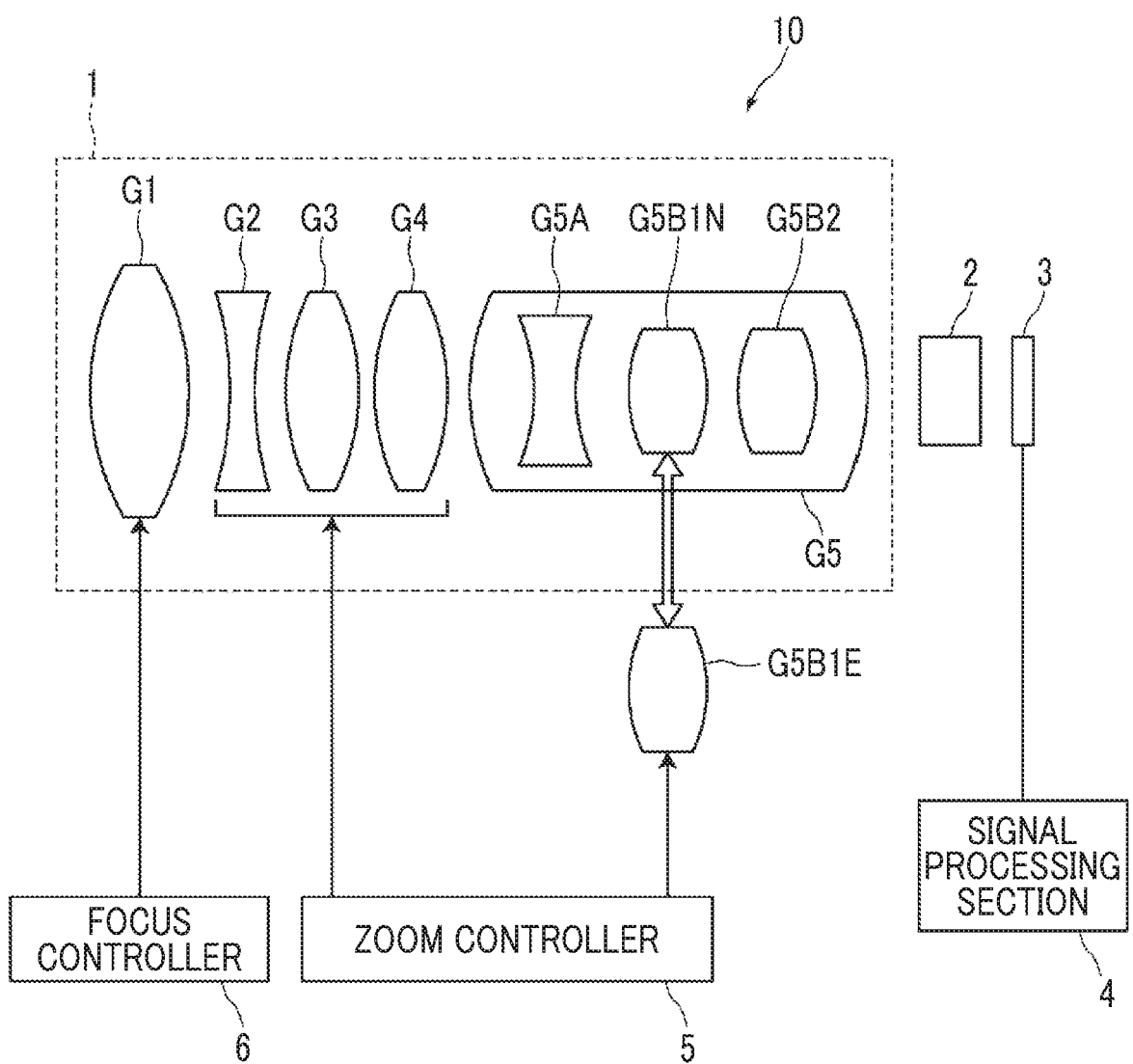
FIG. 11 is a schematic configuration diagram of an imaging apparatus according to an embodiment of the present invention.

Next, an imaging apparatus according to an embodiment of the present invention will be described. FIG. 11 is a schematic configuration diagram of an imaging apparatus 10 using the zoom lens 1 according to the above-mentioned embodiment of the present invention as an example of an imaging apparatus of an embodiment of the present invention. Examples of the imaging apparatus 10 include a broadcasting camera, a movie imaging camera, a digital camera, a video camera, a surveillance camera, and the like.

The imaging apparatus 10 comprises a zoom lens 1, an optical member 2 which is disposed on the image side of the zoom lens 1, and an imaging element 3 which is disposed on the image side of the optical member 2. The optical member 2 assumes a filter and/or a prism. In FIG. 11, the first lens group G1, the second lens group G2, the third lens group G3, the fourth lens group G4, the fifth lens group G5, the fifth A lens group G5A, the fifth B1N lens group G5B1N, the fifth B1E lens group G5B1E and the fifth B2 lens group G5B2 included in the zoom lens 1 are schematically shown, and the aperture stop St is not shown.

The imaging element 3 converts an optical image formed by the zoom lens 1 into an electric signal, for example, using a charge coupled device (CCD) or a complementary metal oxide semiconductor (CMOS). The imaging element 3 is disposed such that the imaging surface thereof is coplanar with the image plane of the zoom lens 1. It should be noted that FIG. 9 shows only one imaging element 3, but the imaging apparatus of the present invention is not limited to this, and may be a so-called three-plate imaging apparatus having three imaging elements.

The imaging apparatus 10 also comprises a signal processing section 4 which performs calculation processing on an output signal from the imaging element 3, a zoom controller 5 which controls zooming of the zoom lens 1, and a focus controller 6 which controls focusing of the zoom lens 1. The fifth B1N lens group G5B1N is replaced by the fifth B1E lens group G5B1E which is the extender lens by the zoom controller 5.

The present invention has been hitherto described through embodiments and examples, but the present invention is not limited to the above-mentioned embodiments and examples, and may be modified into various forms. For example, values such as the number of lenses of each lens group, the curvature radius, the surface distance, the refractive index, the Abbe number, the partial dispersion ratio, and the aspheric coefficient of each lens are not limited to the values shown in the numerical examples, and different values may be used therefor.

EXPLANATION OF REFERENCES

1: zoom lens
2: optical member

3: imaging element
4: signal processing section
5: zoom controller
6: focus controller
10: imaging apparatus
G1: first lens group
G2: second lens group
G3: third lens group
G4: fourth lens group
G5: fifth lens group
G5A: fifth A lens group
G5B: fifth B lens group
G5B1N: fifth B1N lens group
G5B1E: fifth B1E lens group
G5B2: fifth B2 lens group
L1a to L5p: lens
PP: optical member
Sim: image plane
St: aperture stop
Wa: on-axis rays
Wb: rays with the maximum angle of view
Z: optical axis

What is claimed is:

1. A zoom lens consisting of, in order from an object side:
a first lens group having a positive refractive power;
a second lens group having a negative refractive power;
a third lens group having a positive refractive power;
a fourth lens group having a positive refractive power; and
a fifth lens group having a positive refractive power,
wherein, during zooming, the first lens group and the fifth lens group are fixed with respect to an image plane, and the second lens group, the third lens group, and the fourth lens group move with mutual intervals therebetween being changed,
wherein, during zooming from a wide angle end to a telephoto end, the fourth lens group moves from an image side to the object side, and the second lens group and a composite group consisting of the third lens group and the fourth lens group pass through points where respective lateral magnifications are −1 at the same time,
wherein the fifth lens group consists of, in order from the object side, a fifth A lens group having a negative refractive power and moving in a direction having a component perpendicular to an optical axis during anti-shake operation to perform image shake correction, and a fifth B lens group having a positive refractive power and being fixed during the anti-shake operation, and
wherein the lateral magnification of the fifth A lens group is negative.

2. The zoom lens according to claim 1,
wherein assuming that the lateral magnification of the fifth A lens group is β5A, Conditional Expression (1) is satisfied;

$$-0.3 < 1/\beta 5A < 0 \qquad (1).$$

3. The zoom lens according to claim 2,
wherein Conditional Expression (1-1) is satisfied;

$$-0.2 < 1/\beta 5A < 0 \qquad (1-1).$$

4. The zoom lens according to claim 1,
wherein assuming that the lateral magnification of the fifth A lens group is β5A and the lateral magnification of the fifth B lens group is β5B, Conditional Expression (2) is satisfied;

$$-1.3 < (1-\beta 5A) \times \beta 5B < -1 \qquad (2).$$

5. The zoom lens according to claim 3,
wherein Conditional Expression (2-1) is satisfied;

$$-1.2 < (1-\beta 5A) \times \beta 5B < -1.1 \qquad (2-1).$$

6. The zoom lens according to claim 1,
wherein assuming that the lateral magnification of the fifth lens group is β5, Conditional Expression (3) is satisfied;

$$0.9 < 1/\beta 5 < 1.1 \qquad (3).$$

7. The zoom lens according to claim 6,
wherein Conditional Expression (3-1) is satisfied;

$$0.91 < 1/\beta 5 < 1 \qquad (3-1).$$

8. The zoom lens according to claim 1,
wherein assuming that the lateral magnification of the fifth A lens group is β5A, the lateral magnification of the fifth B lens group is β5B, and the lateral magnification of the fifth lens group is β5, Conditional Expression (4) is satisfied;

$$-1.4 < (1-\beta 5A) \times \beta 5B/\beta 5 < -1 \qquad (4).$$

9. The zoom lens according to claim 8,
wherein Conditional Expression (4-1) is satisfied;

$$-1.3 < (1-\beta 5A) \times \beta 5B/\beta 5 < -1 \qquad (4-1).$$

10. The zoom lens according to claim 1,
wherein assuming that a focal length of the fifth A lens group is f5A and a focal length of the fifth lens group is f5, Conditional Expression (5) is satisfied;

$$-1.2 < f5A/f5 < -0.5 \qquad (5).$$

11. The zoom lens according to claim 10,
wherein Conditional Expression (5-1) is satisfied;

$$-1.1 < f5A/f5 < -0.5 \qquad (5-1).$$

12. The zoom lens according to claim 1,
wherein assuming that a focal length of the fifth A lens group is f5A and a focal length of the fifth B lens group is f5B, Conditional Expression (6) is satisfied;

$$-1 < f5A/f5B < -0.6 \qquad (6).$$

13. The zoom lens according to claim 12,
wherein Conditional Expression (6-1) is satisfied;

$$-0.9 < f5A/f5B < -0.7 \qquad (6-1).$$

14. The zoom lens according to claim 1,
wherein the fifth A lens group consists of two negative lenses and one positive lens.

15. The zoom lens according to claim 1,
wherein the fifth B lens group consists of, in order from the object side, a fifth B1N lens group having a positive refractive power and a fifth B2 lens group having a positive refractive power,
the fifth MN lens group is replaceable with a fifth B1E lens group that enlarges imaging magnification, a position where the fifth B1N lens group and the fifth B2 lens group are divided is a place in which an air gap on an optical axis is the largest in a state where, assuming that a lateral magnification of the fifth B2 lens group is $\beta 5B2$, Conditional Expression (7) is satisfied $$-1 < \beta 5B2 < 1 \qquad (7), \text{ and}$$

assuming that a focal length of the fifth B2 lens group is f5B2 and a focal length of the fifth B1N lens group is f5B1N, Conditional Expression (8) is satisfied $$f5B2/f5B1N < 0.5 \qquad (8).$$

16. The zoom lens according to claim 15,
wherein, assuming that a focal length of the fifth A lens group is f5A and a focal length of the fifth B1N lens group is f5B1N, Conditional Expression (9) is satisfied;

$$-0.5 < f5A/f5B1N \qquad (9).$$

17. The zoom lens according to claim 16,
wherein Conditional Expression (9-1) is satisfied;

$$-0.4 < f5A/f5B1N < -0.1 \qquad (9-1).$$

18. The zoom lens according to claim 15,
wherein the fifth B1N lens group comprises, in order from the object side, at least two continuous cemented lenses and a positive lens of which a surface on the object side is convex.

19. The zoom lens according to claim 15,
wherein Conditional Expression (8-1) is satisfied;

$$0.1 < f5B2/f5B1N < 0.4 \qquad (8-1).$$

20. An imaging apparatus comprising the zoom lens according to claim 1.

\* \* \* \* \*